US012770603B2

(12) United States Patent
Matsuo et al.

(10) Patent No.: US 12,770,603 B2
(45) Date of Patent: Oct. 20, 2026

(54) EARPHONE AND EARPHONE CONTROL METHOD

(71) Applicant: PANASONIC INTELLECTUAL PROPERTY MANAGEMENT CO., LTD., Osaka (JP)

(72) Inventors: Kiyoto Matsuo, Fukuoka (JP); Yu Tanaka, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 586 days.

(21) Appl. No.: 18/259,234

(22) PCT Filed: Sep. 1, 2021

(86) PCT No.: PCT/JP2021/032185
§ 371 (c)(1),
(2) Date: Jun. 23, 2023

(87) PCT Pub. No.: WO2022/137654
PCT Pub. Date: Jun. 30, 2022

(65) Prior Publication Data

US 2024/0054986 A1 Feb. 15, 2024

(30) Foreign Application Priority Data

Dec. 25, 2020 (JP) ................................. 2020-217010
Dec. 25, 2020 (JP) ................................. 2020-217011
Dec. 25, 2020 (JP) ................................. 2020-217012

(51) Int. Cl.
*G10K 11/178* (2006.01)
*H04R 1/10* (2006.01)

(52) U.S. Cl.
CPC .. *G10K 11/17823* (2018.01); *G10K 11/17825* (2018.01); *G10K 11/17827* (2018.01);
(Continued)

(58) Field of Classification Search
CPC ....... G10K 11/17823; G10K 11/17881; G10K 2210/1081; G10K 11/17827;
(Continued)

(56) References Cited

U.S. PATENT DOCUMENTS 10,586,523 B1 3/2020 Kohler et al.
10,636,405 B1 4/2020 Kemmerer
(Continued)

FOREIGN PATENT DOCUMENTS

CN 111447523 A 7/2020
CN 111586522 A 8/2020
(Continued)

OTHER PUBLICATIONS

European Search Report, dated Sep. 12, 2024, for European Application No. 21909812.6-1207. (16 pages).
(Continued)

*Primary Examiner* — Kile O Blair
(74) *Attorney, Agent, or Firm* — Seed Intellectual Property Law Group LLP

(57) ABSTRACT

This earphone is worn by a user and comprises: a sound pickup unit; a detection unit for detecting movement by the user or the impact of the surrounding environment; and a control unit that performs processing of output sound on the basis of a sound pickup signal picked up by the sound pickup unit and the detection result from the detection unit. For example, not only ambient sound but also noise signals such as breathing sounds, vocal sound, and pulse sounds from the user are adaptively reduced, or ambient sound is introduced into an audio signal. Alternatively, wind noise included in a voice signal or a music signal is adaptively reduced. Alternatively, the characteristics of user voice audio for trans-
(Continued)

mission to be transmitted to a conversation partner terminal are adaptively adjusted, and wind noise included in the user voice audio is reduced.

16 Claims, 10 Drawing Sheets

(52) U.S. Cl.
CPC ..... *G10K 11/17881* (2018.01); *H04R 1/1041* (2013.01); *H04R 1/1083* (2013.01); *G10K 2210/1081* (2013.01); *G10K 2210/3026* (2013.01); *G10K 2210/3027* (2013.01); *G10K 2210/3028* (2013.01); *G10K 2210/3044* (2013.01); *G10K 2210/3056* (2013.01); *H04R 2410/07* (2013.01); *H04R 2460/01* (2013.01)

(58) Field of Classification Search
CPC ............ G10K 11/17879; H04R 1/1083; H04R 2460/01; G10L 25/78
See application file for complete search history.

(56) References Cited

U.S. PATENT DOCUMENTS

| | | | |
|---|---|---|---|
| 2012/0278070 | A1 | 11/2012 | Herve et al. |
| 2015/0170633 | A1 | 6/2015 | Nakagawa et al. |
| 2015/0245129 | A1 | 8/2015 | Dusan et al. |
| 2015/0332662 | A1 | 11/2015 | Hoang Co Thuy et al. |
| 2016/0118035 | A1 | 4/2016 | Hyde et al. |
| 2019/0069074 | A1 | 2/2019 | Yamkovoy |
| 2019/0394557 | A1 | 12/2019 | Konagai et al. |
| 2020/0304904 | A1 | 9/2020 | Konagai et al. |
| 2020/0380945 | A1 | 12/2020 | Woodruff et al. |
| 2020/0382859 | A1 | 12/2020 | Woodruff et al. |
| 2020/0404415 | A1* | 12/2020 | Sapozhnykov ........ H04R 1/222 |

FOREIGN PATENT DOCUMENTS

| | | | |
|---|---|---|---|
| JP | H08275296 | A | 10/1996 |
| JP | 2012231468 | A | 11/2012 |
| JP | 2018163304 | A | 10/2018 |
| WO | WO 2004114722 | A1 | 12/2004 |
| WO | WO 2011140110 | A1 | 11/2011 |
| WO | 2018-163423 | A1 | 9/2018 |
| WO | WO 2019183225 | A1 | 9/2019 |

OTHER PUBLICATIONS

Partial Supplementary European Search Report, dated Apr. 29, 2024, for European Patent Application No. 21909812.6-1207. (13 pages).
International Search Report, mailed Oct. 12, 2021, for International Patent Application No. PCT/JP2021/032185. (5 pages) (with English Translation).

* cited by examiner

EARPHONE AND EARPHONE CONTROL METHOD

TECHNICAL FIELD

The present disclosure relates to an earphone and an earphone control method.

BACKGROUND ART

Among headphones in recent years, headphones that are not only for listening to music played by a portable player but also equipped with a microphone for picking up a speech voice of a user to be transmitted to a call partner via a communication terminal such as a smartphone have been introduced. That is, as a transmission and reception device, headphones having not only a function of a driver for outputting sounds but also a function of a microphone through which a speech voice is input have been commercialized in recent years.

Patent Literature 1 discloses an audio headset that includes a movement sensor and compensates for air pressure phenomena of overpressure or a decrease in an acoustic cavity of a headphone caused by a walking movement of a user wearing the headphone, thereby avoiding a saturation reduction of a signal during movement detected by the movement sensor to reduce noise. In the audio headset, the headphone is disclosed in which a signal picked up by an internal microphone disposed inside the acoustic cavity and a signal transmitted from the movement sensor are analyzed to verify whether a predetermined criterion is satisfied, and an anti-saturation filter is selectively switched in accordance with a result of the verification.

Patent Literature 2 discloses a headphone including a first microphone that picks up ambient sound outside an ear canal of a user, a second microphone that picks up sound in the ear canal, and a driver that emits sound toward the ear canal. The headphone determines whether wind noise is generated by comparing a first signal based on the sound picked up by the first microphone with a second signal based on the sound picked up by the second microphone. It is disclosed that, when it is determined that no wind noise is generated, the headphone adds an input signal (for example, a signal reproduced by an external device) to the first signal and outputs the result to the driver.

CITATION LIST

Patent Literature

Patent Literature 1: JP2015-219527A
Patent Literature 2: WO2018-163423A1

SUMMARY OF INVENTION

Technical Problem

The present disclosure provides an earphone and an earphone control method capable of generating an optimum output sound for a user of the earphone or a call partner based on a picked-up sound signal picked up by a sound pickup unit and a detection result by a detection unit.

Further, the present disclosure provides an earphone and an earphone control method capable of adaptively reducing not only an ambient sound but also noise signals such as breathing sound, user voice, and pulse sound from a user or capturing an ambient sound into an audio signal according to a body motion state or speech state of the user.

Further, the present disclosure provides an earphone and an earphone control method capable of adaptively reducing wind noise included in a voice signal or a music signal according to a state of wind around a user and an operation mode specified by the user.

Furthermore, the present disclosure provides an earphone and an earphone control method capable of adaptively adjusting characteristics of a user voice to be transmitted to a terminal of a call partner according to a state of wind noise that may be generated during a call with the call partner and reducing the wind noise included in the user voice.

Solution to Problem

The present disclosure provide a n earphone worn by a user. The earphone includes a sound pickup unit, a detection unit configured to detect a movement of the user or influence of surroundings, and a control unit configured to process an output sound based on a picked-up sound signal picked up by the sound pickup unit and a detection result by the detection unit.

More specifically, the present disclosure provides an earphone worn by a user, the earphone including:

- a first sound pickup unit configured to pick up an ambient sound of the user;
- a receiving unit configured to receive a music signal from a terminal of the user,
- a vibration detection unit configured to detect vibration based on a movement of the user;
- a periodic sound determination unit configured to determine whether a periodic sound is generated based on a detection result of the vibration;
- an ambient sound adding unit configured to add the ambient sound picked up by the first sound pickup unit to the music signal from the terminal; and
- a signal processing unit configured to vary control by the ambient sound adding unit based on a determination result of the periodic sound.

Further, the present disclosure provides an earphone worn by a user, the earphone including:

- a first sound pickup unit disposed in an acoustic space including an auricle of the user;
- a sound output unit configured to output a music signal from a terminal of the user;
- a vibration detection unit configured to detect vibration based on a movement of the user;
- a periodic sound determination unit configured to determine whether a periodic sound is generated based on a detection result of the vibration;
- a noise reduction unit configured to reduce, based on a signal in which a part of a music signal output from the sound output unit enters around the first sound pickup unit and is picked up, noise included in the music signal from the terminal; and
- a signal processing unit configured to vary control by the noise reduction unit based on a determination result of the periodic sound.

Further, the present disclosure provides an earphone worn by a user, the earphone including:

- a plurality of sound pickup units configured to pick up ambient sounds of the user;
- a receiving unit capable of receiving a voice signal from a terminal of a call partner of the user or a music signal for playing music from a terminal of the user, a wind noise detection unit configured to detect whether wind noise is generated around the user based on the ambient sounds picked up by the plurality of sound pickup units;

a signal processing unit configured to adjust, based on an intensity of the wind noise and the input of the voice signal or the music signal, characteristics of an ambient sound signal to be added to the voice signal or the music signal; and a sound output unit configured to output the voice signal or the music signal to which the ambient sound signal whose characteristics are adjusted is added.

Further, more specifically, the present disclosure provides an earphone worn by a user, the earphone including:

a plurality of sound pickup units configured to pick up ambient sounds of the user;

a speech detection unit configured to detect the presence or absence of a speech of the user;

a wind noise detection unit configured to detect whether wind noise is generated around the user based on the ambient sounds picked up by the plurality of sound pickup units;

a signal processing unit configured to adjust, based on the presence or absence of a speech of the user and a detection result of the wind noise, characteristics of a voice signal based on a speech of the user.

Further, the present disclosure provides an earphone control method in an earphone worn by a user, the method including:

a step of picking up a sound;

a step of detecting a movement of the user or influence of surroundings; and a step of processing an output sound based on a picked-up sound signal in the step of picking up a sound and a detection result in the step of detecting.

More specifically, the present disclosure provides an earphone control method in an earphone worn by a user, the method including:

a step of picking up an ambient sound of the user;

a step of receiving a music signal from a terminal of the user;

a step of detecting vibration based on a movement of the user;

a step of determining whether a periodic sound is generated based on a detection result of the vibration, a step of adding the picked up ambient sound to the music signal from the terminal, and a step of varying, based on a determination result of the periodic sound, control when the ambient sound is added.

Furthermore, the present disclosure provides an earphone control method in an earphone worn by a user, the method including:

a step of picking up music in an acoustic space by a sound pickup unit disposed in the acoustic space including an auricle of the user;

a step of outputting a music signal from a terminal of the user;

a step of detecting vibration based on a movement of the user;

a step of determining whether a periodic sound is generated based on a detection result of the vibration;

a step of reducing, based on a signal in which a part of the output music signal enters around the sound pickup unit and is picked up, noise included in the music signal from the terminal; and a step of varying, based on a determination result of the periodic sound, control when reducing the noise.

In addition, the present disclosure provides an earphone control method in an earphone worn by a user, the method including:

a step of picking up ambient sounds of the user at a plurality of locations;

a step of receiving a voice signal from a terminal of a call partner of the user or a music signal for playing music from a terminal of the user;

a step of detecting whether wind noise is generated around the user based on the ambient sounds picked up at the plurality of locations;

a step of adjusting, based on an intensity of the wind noise and the input of the voice signal or the music signal, characteristics of an ambient sound signal to be added to the voice signal or the music signal; and a step of outputting the voice signal or the music signal to which the ambient sound signal whose characteristics are adjusted is added.

More specifically, the present disclosure provides an earphone control method in an earphone worn by a user, the method including:

a step of picking up ambient sounds of the user at a plurality of locations;

a step of detecting the presence or absence of a speech of the user;

a step of detecting whether wind noise is generated around the user based on the ambient sounds picked up at the plurality of locations;

a step of adjusting, based on the presence or absence of a speech of the user and a detection result of the wind noise, characteristics of a voice signal based on a speech of the user.

Advantageous Effects of Invention

According to the present disclosure, it is possible to generate an optimum output sound for a user of an earphone or a call partner based on a picked-up sound signal picked up by the sound pickup unit and a detection result by the detection unit.

According to the present disclosure, it is possible to adaptively reduce not only an ambient sound but also noise signals such as breathing sound, user voice, and pulse sound from a user or capture an ambient sound into an audio signal according to a body motion state or speech state of the user.

Further, according to the present disclosure, it is possible to adaptively reduce wind noise included in a voice signal or a music signal according to a state of wind around a user and an operation mode specified by the user.

Still further, according to the present disclosure, it is possible to adaptively adjust characteristics of a user voice to be transmitted to a terminal of a call partner according to a state of wind noise that may be generated during a call with the call partner and reduce the wind noise included in the user voice.

DESCRIPTION OF EMBODIMENTS

Figure 1:
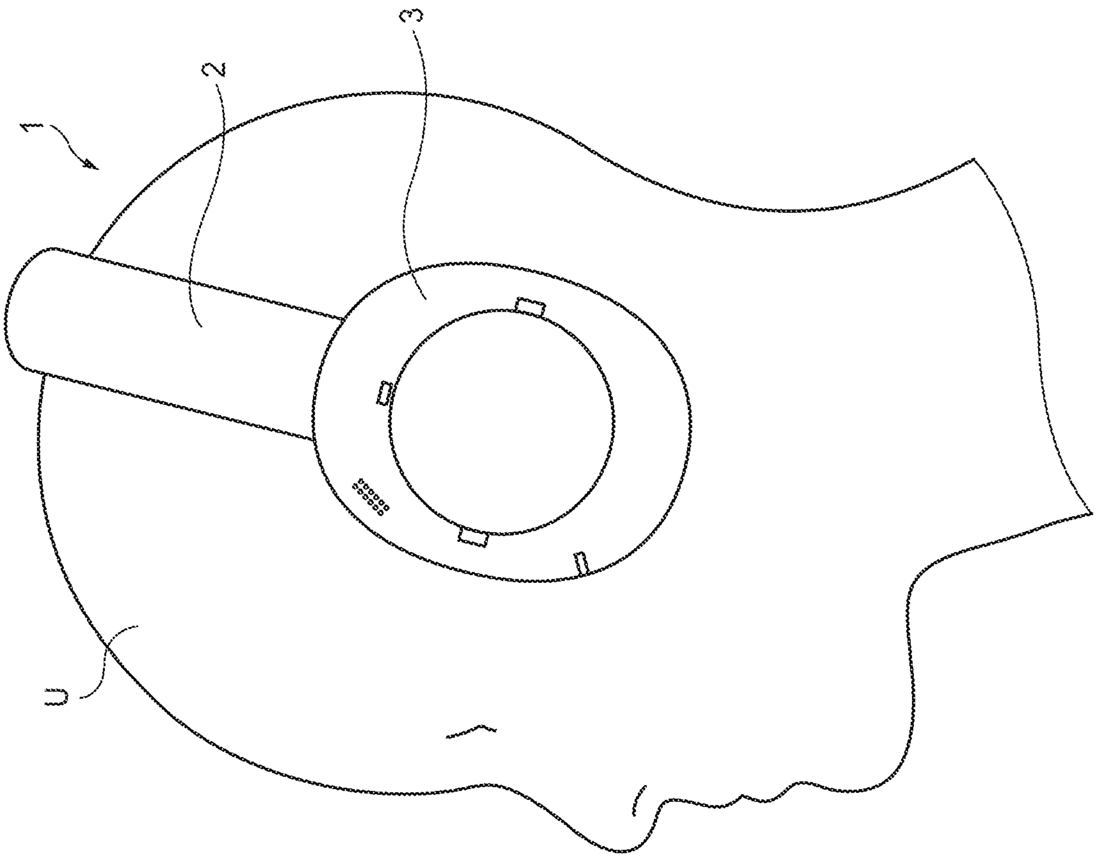
FIG. 1 is a side view illustrating a state in which a headphone according to a first embodiment is attached to a head of a user.

Hereinafter, embodiments of an earphone and an earphone control method according to the present disclosure will be described in detail with reference to the drawings as appropriate. However, unnecessarily detailed description may be omitted. For example, detailed description of well-known matters and redundant description of substantially the same configuration may be omitted. This is to avoid unnecessary redundancy of the following description and to facilitate understanding of those skilled in the art. The accompanying drawings are referred to in accordance with the direction of the reference numerals. The accompanying drawings and the following description are provided for those skilled in the art to fully understand the present disclosure and are not intended to limit the subject matters described in the claims.

For example, in the present disclosure, an overhead headphone worn on a head of a user as an earphone is described as an example of the present disclosure, but the present disclosure is not limited thereto, and an inner-ear type earphone may be used. That is, the present disclosure can be applied to an earphone that is not provided with main body portions and ear pads as casings that surround or cover ears. In addition, the present disclosure is not limited to an embodiment such as a headphone or an earphone as long as it includes a driver, a microphone, and the like, and the content of the present disclosure can be appropriately applied as long as it is a device used as an earphone.

In the embodiments, "unit" or "device" is not limited to a physical configuration that is mechanically implemented by hardware, and also includes those that implement functions of the configuration by software such as a program. Functions of one configuration may be implemented by two or more physical configurations, or functions of two or more configurations may be implemented by, for example, one physical configuration.

First Embodiment

A first embodiment according to the present disclosure will be described with reference to FIGS. 1 to 6.

Background of First Embodiment

First, the background of the present embodiment will be described.

In the configuration disclosed in WO2018-163423A1, it is possible to reduce wind noise when wind noise is generated while listening to a played music sound. However, in the configuration disclosed in WO2018-163423A1, it is not assumed that wind noise is generated when a user wearing a headphone is talking to a call partner. Therefore, in a case where wind noise is generated when the user is talking to the call partner, it is difficult to reduce the wind noise included in a speech voice (in other words, a voice signal to be transmitted to the call partner) of the user, and there is room for improvement.

In contrast, in the present embodiment, it is possible to adaptively adjust characteristics of a user voice to be transmitted to a terminal (smartphone or the like) of a call partner according to a state of wind noise that may be generated during a call with the call partner and to reduce the wind noise included in the user voice.

[Hardware Configuration of Headphone]

Figure 2:
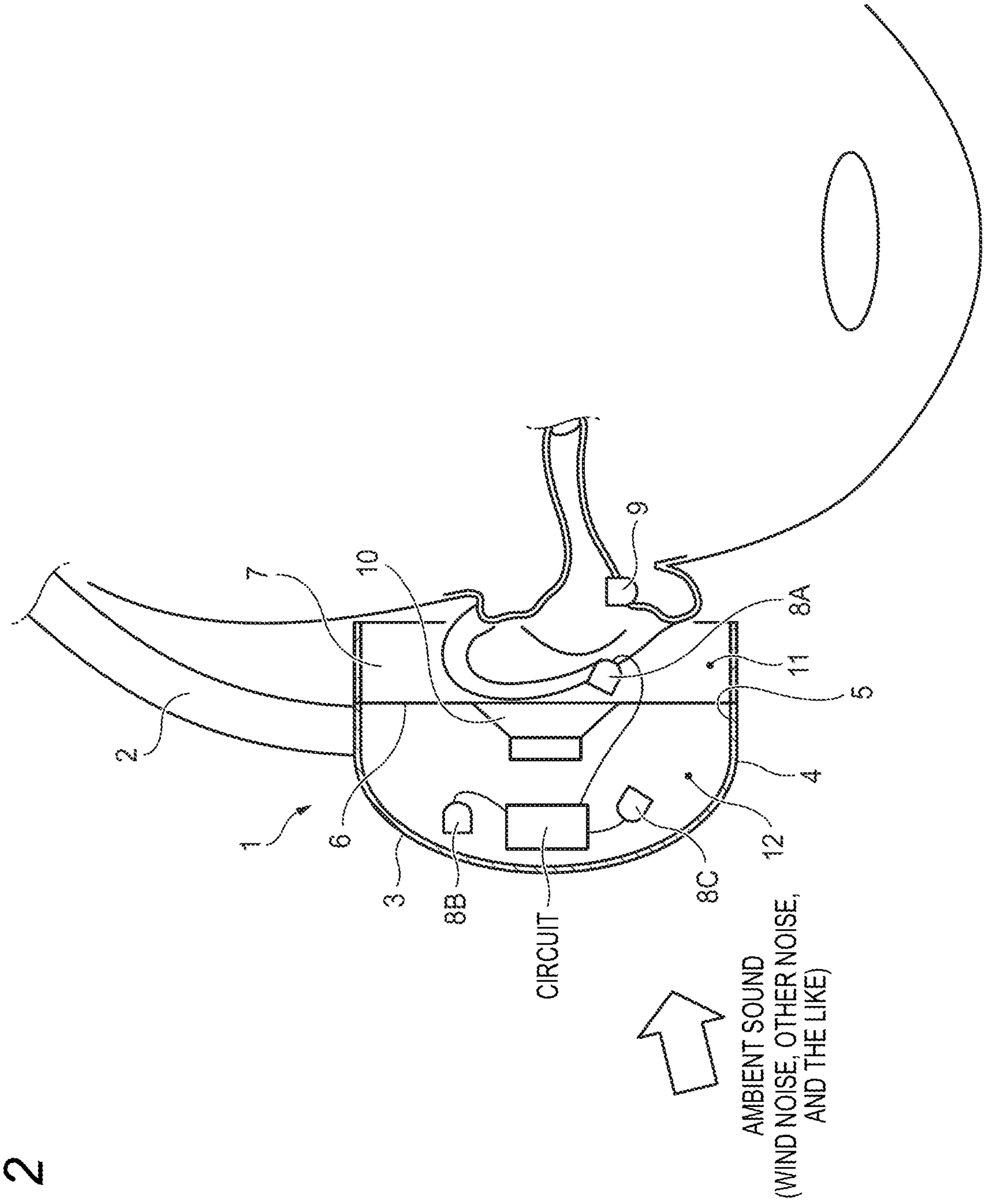
FIG. 2 is a cross-sectional view schematically illustrating an internal hardware configuration of the headphone shown in FIG. 1.

A hardware configuration of a headphone 1 (an example of the earphone) according to the present embodiment will be described with reference to FIGS. 1 and 2. FIG. 1 is a side view illustrating a state in which the headphone 1 according to the first embodiment is attached to a head of a user U. FIG. 2 is a cross-sectional view schematically illustrating an internal hardware configuration of the headphone 1 shown in FIG. 1.

As shown in FIGS. 1 and 2, the headphone 1 of the present embodiment is, for example, an overhead type, and includes a headband 2 and a pair of main body portions 3 disposed at both end portions of the headband 2. In the present embodiment, the headphone 1 includes a wireless communication unit (not shown) capable of communicating according to a Bluetooth (registered trademark) communication standard and is wirelessly connected to a sound source device such as a radio device or a music player for playing music or a telephone device such as a smartphone P1 (see FIG. 3) of the user U to be used as a telephone. The headphone 1 receives voice signals, music signals, control signals, and the like transmitted from these devices, and outputs the voice signals as sound waves, or picks up a speech of the user U and transmits a sound pickup result to these devices.

In the present embodiment, smartphones P1 and P2 are shown and described as an example of devices with which the headphone 1 communicate wirelessly, but the devices are not limited thereto and the headphone 1 can be connected to various devices as long as wireless communication is possible. In the following description, the term "voice signal" includes a concept of a music signal unless otherwise specified.

The headband 2 is formed of an elongated member, is formed to be curved in a substantial arc shape, and is elastically provided. The headband 2 sandwiches the head of the user U from both left and right sides while the user U is wearing the headphone 1. As a result, the elasticity of the headband 2 allows the headphone 1 to be attached to the head of the user U by pressing the pair of main body portions 3 against the left and right sides of the head of the user U.

A pair of expansion and contraction mechanisms may be provided in the headband 2 of the present embodiment, and a length of the headband 2 may be adjusted according to a size of the head of the user U by expanding and contracting the pair of expansion and contraction mechanisms.

The pair of main body portions 3 are members that are brought into contact with ears of the user U wearing the headphone 1, and are formed in a dome shape or an egg shape. When the headphone 1 is worn on the head of the user U, the pair of main body portions 3 are disposed to cover the ears of the user U, and the disposed state is a normal usage state of the headphone 1. Each of the pair of main body portions 3 includes, as structural members, a housing 4, a partition plate 6, and an ear pad 7.

The housing 4 forms an outer shell of the main body portion 3, is formed in a dome shape, and has an opening 5. The housings 4 are attached to the headband 2 such that openings 5 are disposed to face each other with the head of the user U interposed therebetween while the user U is wearing the headphone 1.

The partition plate 6 is a plate-shaped member forming an inner shell of the main body portion 3 and is disposed to close the opening 5 of the housing 4. A through hole is formed in a central portion of the partition plate 6, and a driver 10 (which will be described later) is inserted and fixed to the through hole. A housing space 12 is defined by the housing 4 and the partition plate 6.

The ear pad 7 is formed in an annular shape, and covers the ear of the user U wearing the headphone 1 to wrap the ear from the sides. The ear pad 7 is disposed on a circumferential edge portion of the opening 5 of the housing 4 to extend in a circumferential direction thereof. The ear pad 7 is made of a soft resin material, and is provided around the ear of the user U to be deformable according to a shape thereof. This deformation makes it possible to improve the close contact between the ear pad 7 and the periphery of the ear of the user U. An acoustic space 11 is defined by the ear pad 7 and the partition plate 6. While the user U is wearing the headphone 1, the acoustic space 11 is a sealed space including an auricle of the user U in a contact area of the ear pad 7.

In the acoustic space 11, leakage of sound to the outside of the headphone 1 and entering of ambient sound into the headphone 1 are physically prevented by the ear pad 7.

The main body portion 3 also includes the driver 10, a plurality of microphones (an example of a sound pickup unit), a bone conduction sensor 9 (an example of a vibration detection unit which is an example of a detection unit), and a circuit board 20 (an example of a signal processing unit) as electric/electronic members.

The driver 10 outputs a signal such as a voice signal or a music signal. Specifically, the driver 10 includes a diaphragm (not shown) and vibrates the diaphragm based on a voice signal input to the driver 10 to convert the voice signal into a sound wave (air vibration). The sound wave output from the driver 10 propagates to an eardrum of the ear of the user U.

The plurality of microphones includes at least three types of microphones including an internal microphone 8A (an example of a sound pickup unit), an external microphone 8B, and a speech microphone 8C. In the present embodiment, as will be described later, the external microphone 8B and a speaking microphone operate as a sound pickup device that picks up ambient sound of the user U.

The internal microphone 8A is disposed inside the acoustic space 11 defined by the ear pad 7 and the partition plate 6 with a detection portion (not shown) thereof facing the acoustic space 11. In addition, the internal microphone 8A is disposed as close as possible to an ear canal of the ear of the user U inside the acoustic space 11. As a result, the internal microphone 8A picks up a sound physically generated inside the acoustic space 11 including a sound wave output from the driver 10.

That is, the internal microphone 8A is provided to be able to pick up noise entering the acoustic space 11 through the housing 4, the ear pad 7, and the like as a sound signal together with a voice signal or a music signal output from the driver 10. The internal microphone 8A is electrically connected to the circuit board 20 (see FIG. 3) by a signal line.

The external microphone 8B and a speech microphone are housed in the housing space 12 defined by the housing 4 and the partition plate 6. A plurality of through holes (not shown) are formed in the housing 4, and the external microphone 8B and the speech microphone 8C are attached to the housing 4 to be capable of picking up a sound outside the headphone 1 through the respective through holes.

The external microphone 8B is disposed to be able to pick up an ambient noise (for example, a wind noise) outside the headphone 1. The speech microphone 8C is disposed to be able to pick up a speech of the user U wearing the headphone 1, and implements a hands-free call together with the driver 10 in a state in which the headphone 1 can communicate with a mobile phone device such as the smartphone P1.

The bone conduction sensor 9 includes a piezo element (not shown) and the like, and converts vibration (bone conduction vibration) transmitted to bones of the user U into an electric signal. The bone conduction sensor 9 is attached to the headphone 1 to be in contact with a face around the ear or a back surface of the auricle. In the acoustic space 11, the bone conduction sensor 9 is spaced apart from the driver 10. Since a voice spoken by the user U is conducted to bones of the face or head thereof, vibration of human bones is detected, and a detection result is converted into an electric signal and output. The presence or absence of a speech of the user U can be detected according to the electric signal. The bone conduction sensor 9 is electrically connected to the circuit board 20 (see FIG. 3) by a signal line.

The circuit board 20 (see FIG. 3) is formed in a flat plate shape, and a plurality of circuits are disposed on a surface thereof. That is, the circuit board 20 operates as a control board of the headphone 1 that includes a plurality of central processing circuits (not shown), read only storage circuits (not shown), and writable storage circuits (not shown) and performs signal processing as appropriate.

[Configuration of Circuit Board]

Figure 3:
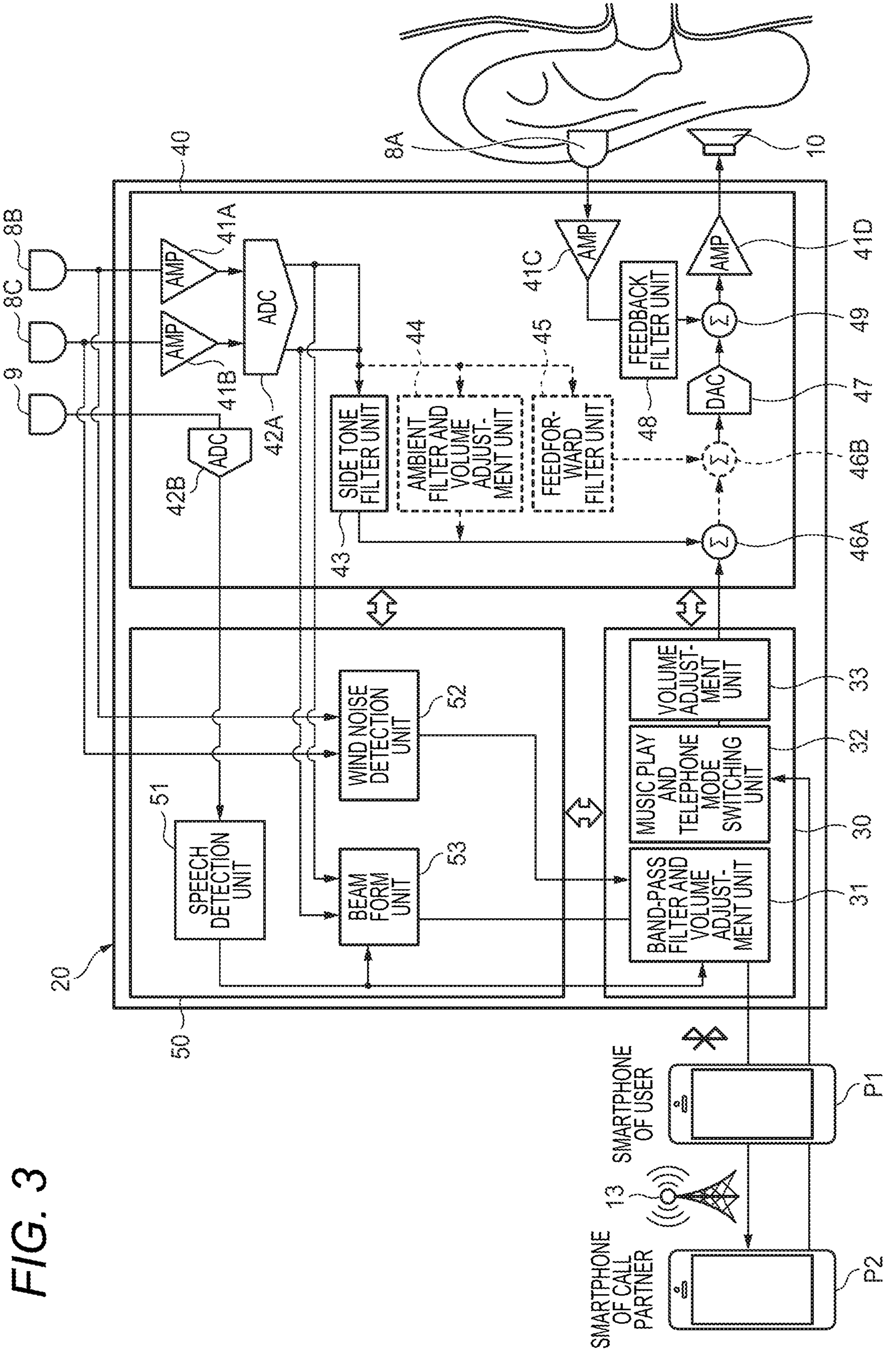
FIG. 3 is a hardware block diagram illustrating processing in a circuit board shown in FIG. 2.

Next, a configuration of the circuit board 20 will be described with reference to FIG. 3. FIG. 3 is a hardware block diagram illustrating processing in the circuit board 20 shown in FIG. 2.

The circuit board 20 is configured as a general-purpose control board as described above, and programs (not shown) as software stored in a storage device (not shown) provided in the control board are executed by an arithmetic device (not shown) such as the central processing circuit of the circuit board 20. In the present embodiment, a plurality of integrated circuits for specializing predetermined processing as hardware physically mounted on the circuit board 20 are also mounted on the circuit board 20. That is, blocks shown inside the circuit board 20 shown in FIG. 3 represent functions implemented by the software such as the programs or functions implemented by the hardware such as the dedicated integrated circuits.

In the present embodiment, the functions implemented by the circuit board 20 are implemented by both the software and the hardware, but the present disclosure is not limited thereto. For example, all the functions may be configured by hardware as physical configurations of a "device".

Further, as described above, a wireless communication unit (not shown) is mounted on the circuit board 20, and in the present embodiment, the circuit board 20 is wirelessly connected to the smartphone P1 of the user U via the wireless communication unit. The headphone 1 of the user U and the other smartphone P2 including a call partner are both connected to a mobile phone network 13, and the user U can make a phone call, that is, speak or send a call to the call partner through the mobile phone network 13 (see FIG. 3). When speaking or sending a call, the user U can use the headphone 1 of the present embodiment to make a hands-free call. When a hands-free call is made, a voice signal for speech or transmission is exchanged between the smartphone P1 and the headphone 1 of the user U through wireless communication.

In the present embodiment, the wireless communication unit of the headphone 1 performs communication according to the Bluetooth (registered trademark) communication standard, but is not limited thereto, and may be provided to be connectable to a communication line such as WiFi (registered trademark) or a mobile communication line. The mobile phone network 13 may include at least a wired or wireless line that enables communication between telephone devices such as the smartphone P1, and may include a part or all of an Internet line. In addition, the mobile phone network 13 may appropriately include a local area network (LAN), a wide area network (WAN), and other types of networks, which are used by being connected to one another in order to facilitate communication between the telephone devices.

In the present embodiment, a case where the headphone 1 is used as a telephone is described as one example, and as will be described later, an ambient filter and volume adjustment unit 44, a feedforward filter unit 45, and a second digital addition unit 46B in an ANC circuit 40 do not operate (see dotted lines).

As shown in FIG. 3, on the circuit board 20, at least a main circuit 30 (an example of the signal processing unit), the ANC circuit 40 (an example of the signal processing unit), and a detection circuit 50 (an example of the signal processing unit which is an example of a control unit, or an example of a periodic sound determination unit which is an example of the control unit) are mounted. The main circuit 30, the detection circuit 50, and the ANC circuit 40 control one another in a consistent manner by transmitting and receiving a control signal to and from one another, and exchange a voice signal with a digital signal of a pulse code modulation (PCM).

The main circuit 30 includes a band-pass filter and volume adjustment unit 31 (an example of a signal processing unit), a music play and telephone mode switching unit 32 (an example of a receiving unit), and a volume adjustment unit 33.

The band-pass filter and volume adjustment unit 31 receives a control signal of a detection result of a speech detection unit 51 (to be described later) and a wind noise detection unit 52 (to be described later) of the detection circuit 50, and also receives, as a digital signal, a voice signal transmitted from a beam form unit 53 (to be described later) of the detection circuit 50. Based on the control signal from the detection circuit 50, the band-pass filter and volume adjustment unit 31 allows a voice component of a predetermined frequency band of the received voice signal to pass through, and adjusts a volume level of the voice signal (for example, the voice signal based on a speech of the user U or the voice signal of an ambient sound) that passes.

That is, the band-pass filter and volume adjustment unit 31 adjusts, based on the presence or absence of a speech of the user U and a detection result of a wind noise, characteristics of a voice signal based on a speech of the user U. The adjusted voice signal is wirelessly transmitted as a transmission signal to the smartphone P1 of the user U through the wireless communication unit of the circuit board 20. The band-pass filter and volume adjustment unit 31 is provided to operate only when the headphone 1 is used as a telephone.

The music play and telephone mode switching unit 32 is wirelessly connected to the smartphone P1 of the user U through the wireless communication unit of the circuit board 20, and receives a voice signal transmitted from the smartphone P1. That is, the music play and telephone mode switching unit 32 is provided to be able to receive a voice signal from the smartphone P2 of the call partner or a music signal to be played. Then, based on the received voice signal or the control signal transmitted from the smartphone P1, the music play and telephone mode switching unit 32 determines whether an operation mode (use) of the headphone 1 is music play or telephone use, and manages the input.

For example, in the present embodiment, the music play and telephone mode switching unit 32 receives a voice signal transmitted from the call partner of the user U as a received signal, and determines that the operation mode is telephone use based on a reception result. Then, the music play and telephone mode switching unit 32 switches the operation mode of the headphone 1 to the telephone use, and transmits the received voice signal to the volume adjustment unit 33. The volume adjustment unit 33 adjusts a volume level of the transmitted voice signal and transmits the adjusted volume level to a first digital addition unit 46A (to be described later) of the ANC circuit 40.

The ANC circuit 40 includes a first amplifier unit 41A, a second amplifier unit 41B, a third amplifier unit 41C, a fourth amplifier unit 41D, a first analog-to-digital conversion unit 42A, a second analog-to-digital conversion unit 42B, a side tone filter unit 43, the ambient filter and volume adjustment unit 44, the feedforward filter unit 45, the first digital addition unit 46A, the second digital addition unit 46B, a digital-to-analog conversion unit 47, a feedback filter unit 48, and an analog addition unit 49.

The first amplifier unit 41A is electrically connected to the external microphone 8B, amplifies a voice signal output from the external microphone 8B, and outputs the amplified voice signal to the first analog-to-digital conversion unit 42A.

The second amplifier unit 41B is electrically connected to the speech microphone 8C, amplifies a voice signal output from the speech microphone 8C, and outputs the amplified voice signal to the first analog-to-digital conversion unit 42A.

The first analog-to-digital conversion unit 42A converts analog signals of two channels based on the speech microphone 8C or the external microphone 8B into digital signals. The first analog-to-digital conversion unit 42A transmits the digital signals of two channels to the side tone filter unit 43, the ambient filter and volume adjustment unit 44, the feedforward filter unit 45, and the beam form unit 53 (to be described later) of the detection circuit 50.

The second analog-to-digital conversion unit 42B is electrically connected to the bone conduction sensor 9, and converts an electric signal output from the bone conduction sensor 9 into a digital signal. The second analog-to-digital conversion unit 42B transmits the digital signal to the speech detection unit 51 (to be described later) of the detection circuit 50.

The side tone filter unit 43 receives the voice digital signals of two channels transmitted from the first analog-to-digital conversion unit 42A. The voice digital signals are based on the external microphone 8B and the speech microphone 8C, and the side tone filter unit 43 transmits the voice digital signals to the first digital addition unit 46A.

That is, when the headphone 1 is used as a telephone, the external microphone 8B and the speech microphone 8C pick up a speech of the user U. Therefore, as a result of the operation of the side tone filter unit 43, a part of the speech of the user U is looped back (added) to a voice signal output to the driver 10. As a result, the user U can listen to his/her own voice through the headphone 1, and can easily speak when the headphone 1 is used as a telephone. The side tone filter unit 43 is provided to operate only when the headphone 1 is used as a telephone.

Similarly, the ambient filter and volume adjustment unit 44 receives the audio digital signals of two channels output from the first analog-to-digital conversion unit 42A. The ambient filter and volume adjustment unit 44 mainly extracts low frequency components of these voice signals of two channels, adjusts a volume level of the extracted components, and transmits the adjusted volume level to the first digital addition unit 46A.

In a normal usage state of the headphone 1, an ambient sound of the user U is prevented from being transmitted to the inside of the acoustic space 11 by the ear pad 7 and the like. Therefore, when the ambient filter and volume adjustment unit 44 operates, ambient sounds such as vehicle noise and alarm sirens can be actively captured through the external microphone 8B and the speech microphone 8C, and the ambient sounds can be electrically passed from the outside to the ear canal of the user U. As a result, the user U can have a grasp of an ambient sound situation even when wearing the headphone 1.

The ambient filter and volume adjustment unit 44 has its operation on and off controlled by an operation system or an application installed in the smartphone P1 or the like, and in the present embodiment, the ambient filter and volume adjustment unit 44 is set to OFF. Therefore, in FIG. 3, a block representing the ambient filter and volume adjustment unit 44 and a signal line related thereto are shown by dotted lines.

Similarly, the feedforward filter unit 45 receives the audio digital signals of two channels output from the first analog-to-digital conversion unit 42A. The feedforward filter unit 45 performs filter processing around a midrange (medium frequency) component including many human voices, and transmits a processing result to the second digital addition unit 46B. Similarly, the feedforward filter unit 45 is set to OFF in the present embodiment. Therefore, in FIG. 3, a block representing the feedforward filter unit 45 and a signal line related thereto are shown by dotted lines.

The first digital addition unit 46A adds the audio digital signals transmitted from the side tone filter unit 43 or the ambient filter and volume adjustment unit 44 and the audio digital signal transmitted from the volume adjustment unit 33 of the main circuit 30, and then transmits a result to the second digital addition unit 46B.

The second digital addition unit 46B receives the audio digital signals transmitted from the first digital addition unit 46A and the feedforward filter unit 45, adds these digital signals, and transmits an addition result to the digital-to-analog conversion unit 47. Since the feedforward filter unit 45 is set to OFF in the present embodiment, the second digital addition unit 46B has no input and simply allows (performs through control on) the transmission from the first digital addition unit 46A to pass through. Therefore, in FIG. 3, a block diagram representing the second digital addition unit 46B is shown by a dotted line.

The digital-to-analog conversion unit 47 converts the addition result into an analog signal, and outputs the converted analog signal to the analog addition unit 49.

The third amplifier unit 41C is electrically connected to the internal microphone 8A, amplifies a voice signal (that is, a sound signal) output from the internal microphone 8A, and outputs the amplified audio signal to the feedback filter unit 48.

The feedback filter unit 48 converts an analog signal based on the internal microphone 8A into an inverted phase to generate an inverted-phase signal, and outputs the inverted-phase signal to the analog addition unit 49.

The analog addition unit 49 adds the voice signal output from the digital-to-analog conversion unit 47 and the voice signal (inverted-phase signal) output from the feedback filter unit 48 as an analog signal and outputs the analog signal to the fourth amplifier unit 41D.

Here, as described above, the internal microphone 8A picks up noise that cannot be completely controlled by the ear pad 7 and enters the acoustic space 11 together with a voice signal or a music signal output from the driver 10 as a sound. The feedback filter unit 48 converts a voice signal of the picked up sound into an inverted phase to generate an inverted-phase signal of the analog signal. The analog addition unit 49 adds the inverted-phase signal to an analog signal immediately before being output to the driver 10. By adding these analog signals, the noise can be actively removed.

As described above, the feedback filter unit 48 and the analog addition unit 49 reduce, based on a signal in which a part of the voice signal output from the driver 10 enters around the internal microphone 8A and is picked up, the noise included in the voice signal from the smartphone P1.

The fourth amplifier unit 41D is electrically connected to the driver 10, amplifies the analog signal output from the analog addition unit 49, and outputs the amplified analog signal to the driver 10. Based on the input, the driver 10 outputs a signal such as a voice signal or a music signal as physical air vibration (sound wave).

Similarly, the feedback filter unit 48 and the analog addition unit 49 have operation on and off controlled by an application installed in the smartphone P1 or the like, and can be freely turned on and off by the user U. When the user U turns off the feedback filter unit 48 and the analog addition unit 49, a control signal related to this setting is transmitted to the analog addition unit 49. Based on the control signal, the analog addition unit 49 controls so as not to receive the voice signal from the feedback filter unit 48.

The detection circuit 50 includes the speech detection unit 51, the wind noise detection unit 52, and the beam form unit 53.

The speech detection unit 51 is connected to the second analog-to-digital conversion unit 42B of the ANC circuit 40, and receives the digital signal transmitted from the second analog-to-digital conversion unit 42B. The digital signal is a signal based on the bone conduction sensor 9, and the speech detection unit 51 detects bone conduction vibration caused by a speech of the user U according to the digital signal, and determines (detects) the presence or absence of a speech of the user U. A detection result is transmitted as a control signal to the beam form unit 53 and the band-pass filter and volume adjustment unit 31 of the main circuit 30. The speech detection unit 51 is provided to operate only when the headphone 1 is used as a telephone.

The wind noise detection unit 52 (an example of the detection unit) is directly electrically connected to the external microphone 8B and the speech microphone 8C, and receives analog signals before being amplified by the first amplifier unit 41A and the second amplifier unit 41B. The analog signals are the analog signals of two channels based on the external microphone 8B and the speech microphone 8C, and the wind noise detection unit 52 detects wind noise around the user U according to the analog signals of two channels to determine (detect) whether wind noise is generated. Further, the wind noise detection unit 52 can detect a level (intensity) of the wind noise by, for example, reading in advance a predetermined threshold stored in the storage device of the circuit board 20 and determining whether the digital signals of two channels are equal to or greater than the threshold.

Specifically, the wind noise detection unit 52 according to the present embodiment calculates a correlation between ambient sounds of two channels picked up respectively by the external microphone 8B and the speech microphone 8C and an intensity level of the ambient sounds. General sounds are often correlated with each other, and when determining that the ambient sounds of two channels have no correlation and the intensity level is high, the wind noise detection unit 52 determines that wind noise is generated. As described above, the wind noise detection unit 52 detects whether wind noise is generated around the user U based on the ambient sounds picked up respectively by the external microphone 8B and the speech microphone 8C, and transmits a detection result to band-pass filter and volume adjustment unit 31 of the main circuit 30 in the present embodiment.

Similarly to the wind noise detection unit 52, the beam form unit 53 is connected to the first analog-to-digital conversion unit 42A of the ANC circuit 40, and receives the digital signals transmitted from the first analog-to-digital conversion unit 42A. The beam form unit 53 performs voice processing for controlling voices other than a speech of the user U on the digital signals of two channels. Through the voice processing, the beam form unit 53 increases the directivity of a voice physically emitted from a mouth of the user U and picks up the voice, and as a result, it is possible to transmit (send) a voice that is easy for the call partner to hear during a hands-free call. As described above, the beam form unit 53 transmits, to the band-pass filter and volume adjustment unit 31, a digital signal whose directivity is enhanced to the mouth of the user U. The beam form unit 53 is provided to operate only when the headphone 1 is used as a telephone.

[Overview of Active Noise Control]

Figure 4:
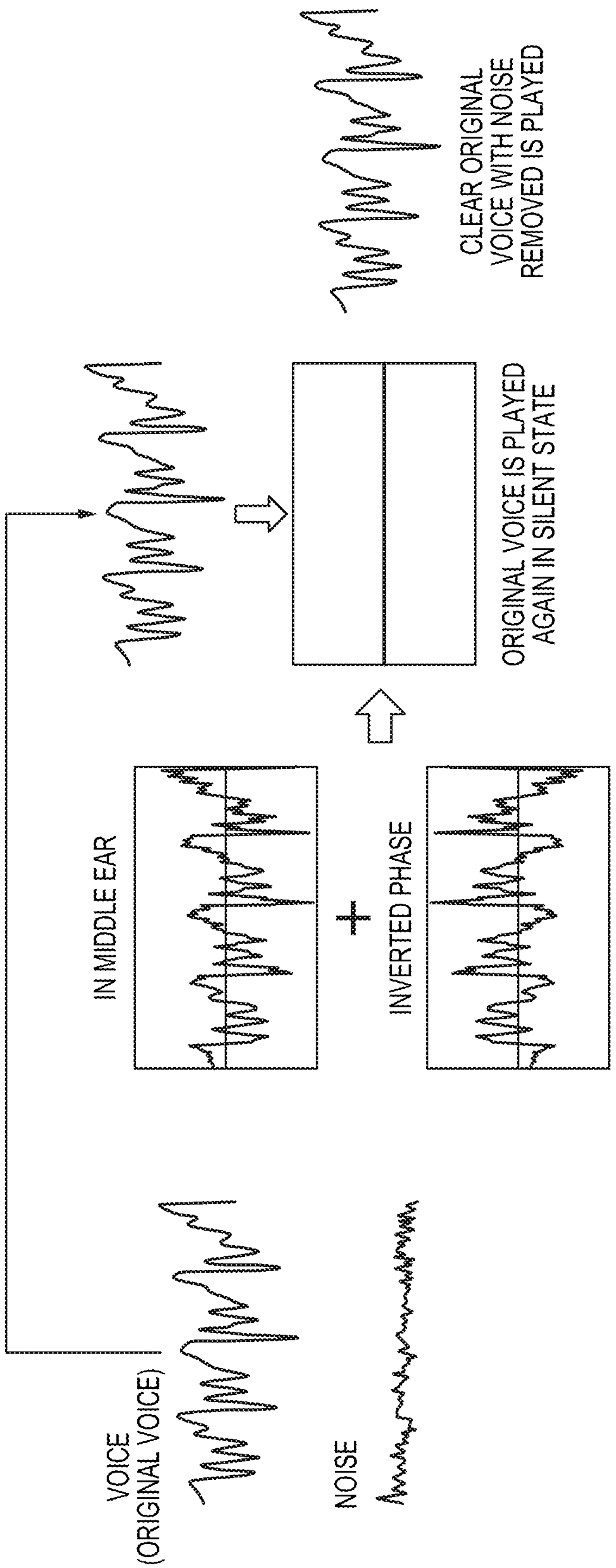
FIG. 4 is a schematic diagram illustrating a first method of active noise control in the headphone shown in FIG. 2.
Figure 5:
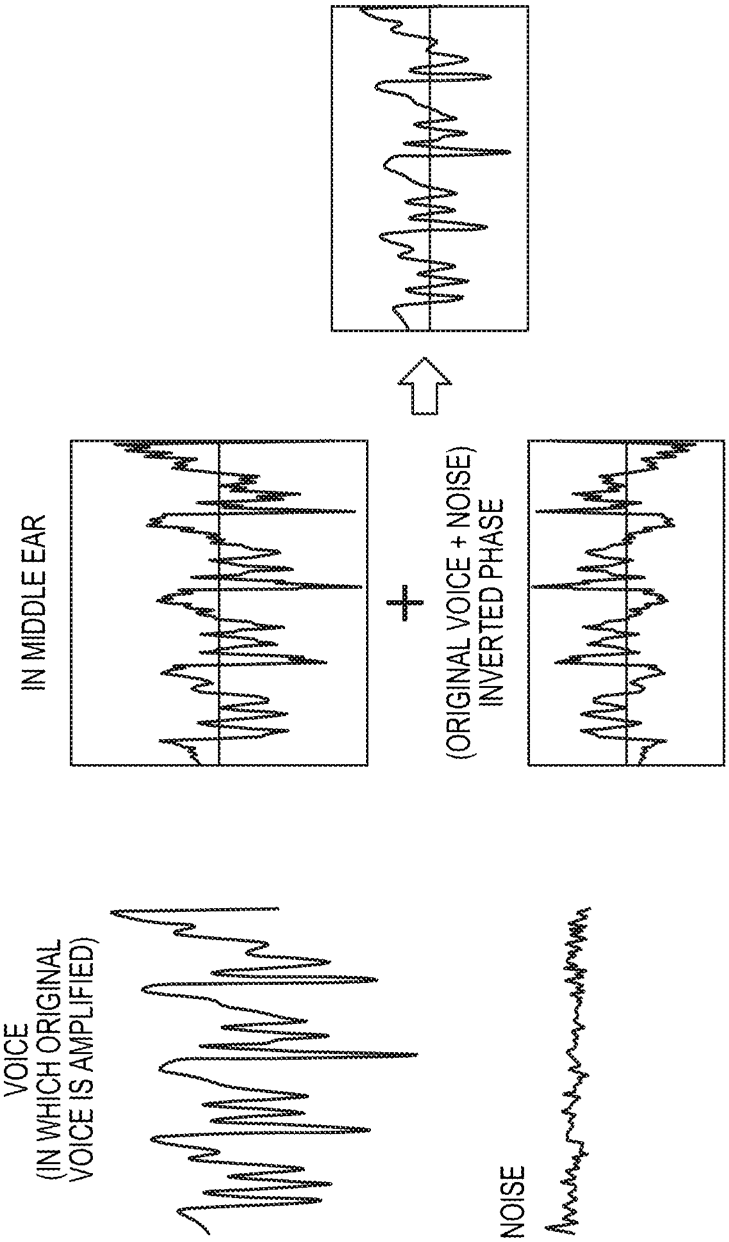
FIG. 5 is a schematic diagram illustrating a second method of active noise control different from the first method shown in FIG. 3.

Next, an overview of active noise control performed by the ANC circuit 40 including the feedback filter unit 48 will be described with reference to FIGS. 4 and 5. FIG. 4 is a schematic diagram illustrating a first method of the active noise control in the headphone 1 shown in FIG. 2. FIG. 5 is a schematic diagram illustrating a second method of the active noise control different from the first method shown in FIG. 3. The first method is ideal and the second method is actually employed.

As shown in FIG. 4, in the first method, noise (wind noise or the like) in an ambient sound of the user U, which cannot be completely physically controlled by the ear pad 7 in the acoustic space 11, is physically added to a voice (original voice) output through the music play and telephone mode switching unit 32. In this state, the voice to which the noise is added is transmitted through a middle ear of the user U, but the ANC circuit 40 of the circuit board 20 picks up the voice to which the noise is added with the internal microphone 8A, and converts the picked up voice signal into an inverted phase to generate an inverted-phase signal.

In the first method, in the acoustic space 11 including the middle ear of the user U, the voice to which the noise is added and the inverted-phase signal thereof are physically output and added, and these voices cancel each other out. As a result, the inside of the middle ear of the user U theoretically is silent (silent state), and in this silent state, the voice (original voice) output through the music play and telephone mode switching unit 32 is output again.

In this manner, in the first method, in a state where the noise is actively removed, a voice that is the same as or close to the original voice is ideally reproduced and transmitted through the middle ear of the user U.

However, the first method is ideal for the active noise control, and it is difficult to perform as ideally as the first method when the first method is actually implemented in the headphone 1. Therefore, in practice, the active noise control is implemented by the second method described below.

As shown in FIG. 5, in the second method which is a practical method, instead of providing a silent state, the voice (original voice) output through the music play and telephone mode switching unit 32 is amplified and output, and the noise in the ambient sound of the user U is physically added to the amplified voice. At this time, by converting a voice signal of a voice obtained by adding the noise to the voice before being amplified, that is, the original voice into an inverted phase in the same manner as in the first method, the ANC circuit 40 of the circuit board 20 generates an inverted-phase signal.

Then, in the second method, inside the acoustic space 11 including the middle ear of the user U, the amplified voice to which the noise is added and the inverted-phase signal thereof are physically output and added. Since a noise level is the same between these voice signals, the original voice component remains after the noise component is mainly removed.

In this manner, in the second method as well, in a state where the noise is actively removed, a voice that is the same as or close to the original voice is practically reproduced and transmitted through the middle ear of the user U. In the present embodiment, the second method described above is applied.

[Processing Flow in Circuit Board]

Figure 6:
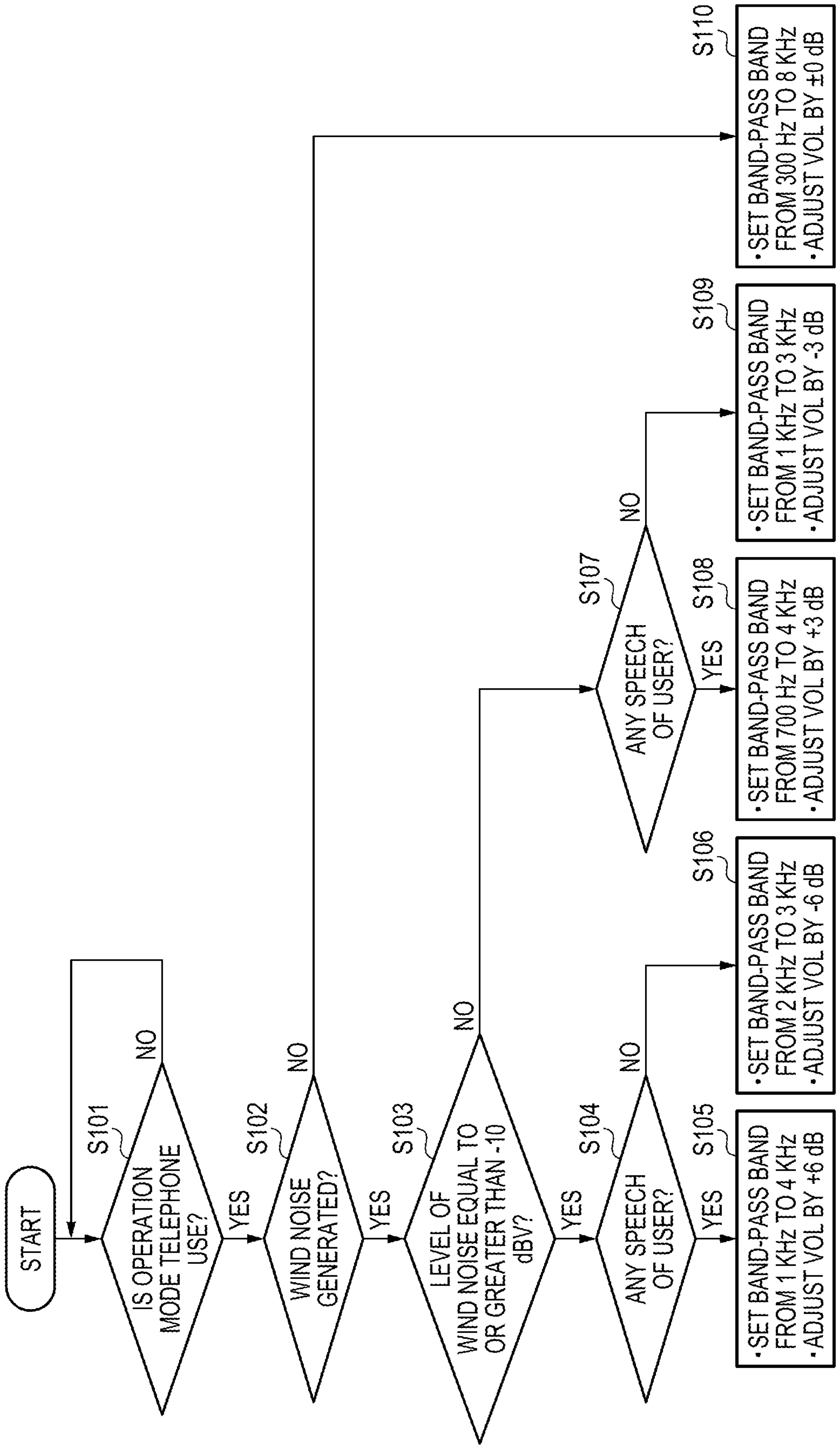
FIG. 6 is a flowchart illustrating a processing flow in the circuit board shown in FIG. 3.

Next, a processing flow in the circuit board 20 according to the present embodiment will be described with reference to FIG. 6. FIG. 6 is a flowchart illustrating the processing flow in the circuit board 20 shown in FIG. 3.

As shown in FIG. 6, the music play and telephone mode switching unit 32 determines whether the operation mode (use) of voice output of the headphone 1 is telephone use (S101). When the music play and telephone mode switching unit 32 determines that the operation mode is not the telephone use (NO in S101) as a determination result, the processing flow returns to step S101 again. That is, unless the operation mode of the headphone 1 is the telephone use, the processing flow does not proceed to step S102 and the subsequent steps.

On the other hand, when the music play and telephone mode switching unit 32 determines that the operation mode is the telephone use (YES in S101), the wind noise detection unit 52 detects wind noise around the user U according to the digital signals of two channels based on the external microphone 8B and the speech microphone 8C to determine whether wind noise is generated (S102). When the wind noise detection unit 52 determines that no wind noise is generated (NO in S102) as a determination result, the band-pass filter and volume adjustment unit 31 allow a voice component in a frequency band from 300 Hz to 8 kHz to pass through but transmits a voice signal without adjusting a volume level of the voice signal (at the same level without increasing or decreasing the volume level) (S110).

When the wind noise detection unit 52 determines that wind noise is generated (YES in S102), the wind noise detection unit 52 detects a level of the wind noise by determining whether the digital signals of two channels are equal to or greater than a threshold read in advance (S103). In the present embodiment, the threshold is set to −10 dBV.

When the wind noise detection unit 52 determines that the level of the wind noise is equal to or greater than a predetermined value (−10 dBV) (YES in S103), the speech detection unit 51 determines, according to a digital signal based on the bone conduction sensor 9, the presence or absence of a speech of the user U (S104). When the speech detection unit 51 determines the presence of a speech of the user U (YES in S104) as a determination result, the band-pass filter and volume adjustment unit 31 allows a voice component in a frequency band from 1 kHz to 4 kHz of a voice signal based on the speech of the user U to pass through. Further, the band-pass filter and volume adjustment unit 31 adjusts a volume level of the passed voice signal by increasing the volume level by +6 dB (S105).

That is, when the level of the wind noise is equal to or greater than the predetermined value (−10 dBV) and a speech of the user U is detected, the band-pass filter and volume adjustment unit 31 allows the voice signal in the frequency band from 1 kHz to 4 kHz (an example of a first frequency band), which is higher than a frequency band of the wind noise, among voice signals based on the speech of the user U to pass through. In addition, the band-pass filter and volume adjustment unit 31 increases the volume level of the voice signal passed in such a frequency band, that is, the volume level of the voice signal based on the speech of the user U by +6 dB (an example of a first predetermined value). Therefore, in the present embodiment, when the user U speaks through the headphone 1 in a state where the level of the wind noise is relatively high, it is possible to adaptively adjust characteristics of a user voice to be transmitted to the smartphone P2 of the call partner and to reduce the wind noise included in the user voice.

When the speech detection unit 51 determines the absence of a speech of the user U (NO in S104), sounds picked up by the external microphone 8B and the speech microphone 8C in this case are ambient sounds, and the band-pass filter and volume adjustment unit 31 allows a voice component in a frequency band from 2 kHz to 3 kHz to pass through. Further, the band-pass filter and volume adjustment unit 31 adjusts a volume level of the passed voice signal by decreasing the volume level by 6 dB (that is, by adding −6 dB) (S106).

That is, in a case where the level of the wind noise is equal to or greater than the predetermined value (−10 dBV) and no speech of the user U is detected, the band-pass filter and volume adjustment unit 31 allows the voice signal in the frequency band from 2 kHz to 3 kHz (an example of a second frequency band), which is higher than the frequency band of the wind noise, among ambient sound signals to pass through. In addition, the band-pass filter and volume adjustment unit 31 adds −6 dB (an example of a second predetermined value) to the volume level of the voice signal passed in such a frequency band, that is, the ambient sound signal (that is, decreases the volume level by 6 dB). Therefore, in the present embodiment, when the user U does not speak through the headphone 1 in a state where the level of the wind noise is relatively high, it is possible to adaptively adjust characteristics of a user voice to be transmitted to the smartphone P2 of the call partner and to reduce the wind noise included in the user voice.

On the other hand, when the wind noise detection unit 52 determines that the level of the wind noise is less than the predetermined value (−10 dBV) (NO in S103), the speech detection unit 51 determines the presence or absence of a speech of the user U (S107). When the wind noise detection unit 52 determines the presence of a speech of the user U (YES in S107) as a determination result, the band-pass filter and volume adjustment unit 31 allows a voice component in a frequency band from 700 Hz to 4 kHz of a voice signal based on the speech of the user U to pass through. Further, the band-pass filter and volume adjustment unit 31 adjusts a volume level of the passed voice signal by increasing the volume level by +3 dB (S108).

That is, in a case where the level of the wind noise is less than the predetermined value (−10 dBV) and a speech of the user U is detected, the band-pass filter and volume adjustment unit 31 allows the voice signal in the frequency band (an example of a third frequency band) from 700 Hz to 4 kHz, which is higher than the frequency band of the wind noise, among voice signals based on the speech of the user U to pass through. In addition, the band-pass filter and volume adjustment unit 31 increases the volume level of the voice signal passed in such a frequency band, that is, the volume level of the voice signal based on the speech of the user U by +3 dB (an example of a third predetermined value). Therefore, in the present embodiment, when the user U speaks through the headphone 1 in a state where the level of the wind noise is relatively low, it is possible to adaptively adjust characteristics of a user voice to be transmitted to the smartphone P2 of the call partner and to reduce the wind noise included in the user voice.

When the speech detection unit 51 determines the absence of a speech of the user U (NO in S107), the band-pass filter and volume adjustment unit 31 of the circuit board 20 allows a voice component in a frequency band from 1 kHz to 3 kHz to pass through. Further, the band-pass filter and volume adjustment unit 31 adjusts a volume level of the passed voice signal by decreasing the volume level by 3 dB (that is, by adding −3 dB) (S109).

That is, in a case where the level of the wind noise is less than the predetermined value (−10 dBV) and no speech of the user U is detected, the band-pass filter and volume adjustment unit 31 of the circuit board 20 allows a voice signal in the frequency band from 1 kHz to 3 kHz (an example of a fourth frequency band), which is higher than the frequency band of the wind noise, among ambient sound signals to pass through. In addition, the band-pass filter and volume adjustment unit 31 of the circuit board 20 adds −3 dB (an example of a fourth predetermined value) to a volume level of the voice signal passed in such a frequency band, that is, the ambient sound signal (that is, decreases the volume level by 3 dB). Therefore, in the present embodiment, when the user U does not speak through the headphone 1 in a state where the level of the wind noise is relatively low, it is possible to adaptively adjust characteristics of a user voice to be transmitted to the smartphone P2 of the call partner and to reduce the wind noise included in the user voice.

In this manner, the circuit board 20 detects the whether or not wind noise is generated around the user U based on ambient sounds picked up by the plurality of microphones, and adjusts, based on the presence or absence of a speech of the user U and a detection result of the wind noise, characteristics of a voice signal based on a speech of the user U. Therefore, in the present embodiment, it is possible to adaptively adjust characteristics of a user voice to be transmitted to the smartphone P2 of the call partner according to a state of wind noise that may be generated during a call with the call partner and to reduce the wind noise included in the user voice.

As described above, according to the headphone 1 (an example of an earphone) of the first embodiment, the headphone 1 worn by the user U includes: a plurality of microphones (an example of a sound pickup unit) that pick up ambient sounds of the user U; the speech detection unit 51 that detects the presence or absence of a speech of the user U; the wind noise detection unit 52 that detects whether wind noise is generated around the user U based on the ambient sounds picked up by the plurality of microphones; the band-pass filter and volume adjustment unit 31 (an example of a signal processing unit) of the circuit board 20 that adjusts, based on the presence or absence of a speech of the user U and a detection result of the wind noise, characteristics of a voice signal based on a speech of the user U.

According to the earphone control method of the first embodiment, the earphone control method in the headphone 1 (an example of an earphone) worn by the user U includes: a step of picking up ambient sounds of the user U at a plurality of locations (sound pickup step); a step of detecting the presence or absence of a speech of the user U (speech detection step); a step of detecting whether wind noise is generated around the user U based on the ambient sounds picked up in the sound pickup step (wind noise detection step); and a step of adjusting, based on the presence or absence of a speech of the user U and a detection result of the wind noise, characteristics of a voice signal based on a speech of the user U (signal processing step).

As a result, according to the headphone 1 or the earphone control method of the first embodiment, it is possible to adaptively adjust characteristics of a user voice to be transmitted to the smartphone P2 (an example of a terminal) of a call partner according to a state of wind noise that may be generated during a call with the call partner and to reduce the wind noise included in the user voice.

According to the headphone 1 (an example of the earphone) of the first embodiment, when a level of wind noise is equal to or greater than the predetermined value (−10 dBV) and a speech of the user U is detected, the band-pass filter and volume adjustment unit 31 (an example of the signal processing unit) of the circuit board 20 allows a voice signal in a frequency band from 1 kHz to 4 kHz (an example of a first frequency band), which is higher than a frequency band of the wind noise, among voice signals based on the speech of the user U to pass through. In addition, the band-pass filter and volume adjustment unit 31 of the circuit board 20 increases a volume level of the voice signal based on the speech of the user U by +6 dB (an example of a first predetermined value). As a result, according to the headphone 1 or the earphone control method of the first embodiment, when the user U speaks through the headphone 1 in a state where the level of the wind noise is relatively high, it is possible to adaptively adjust characteristics of a user voice to be transmitted to the smartphone P2 (an example of the terminal) of the call partner and to reduce the wind noise included in the user voice.

According to the headphone 1 (an example of the earphone) of the first embodiment, when the level of the wind noise is equal to or greater than the predetermined value (−10 dBV) and a speech of the user U is not detected, the band-pass filter and volume adjustment unit 31 (an example of the signal processing unit) of the circuit board 20 allows a voice signal in a frequency band from 2 kHz to 3 kHz (an example of a second frequency band), which is higher than the frequency band of the wind noise, among ambient sound signals to pass through. In addition, the band-pass filter and volume adjustment unit 31 of the circuit board 20 adds −6 dB to a volume level of the ambient sound signal (that is, decreases the volume level by 6 dB (an example of a second predetermined value)). As a result, according to the headphone 1 or the earphone control method of the first embodiment, when the user U does not speak through the headphone 1 in a state where the level of the wind noise is relatively high, it is possible to adaptively adjust characteristics of a user voice to be transmitted to the smartphone P2 (an example of the terminal) of the call partner and to reduce the wind noise included in the user voice.

According to the headphone 1 (an example of the earphone) of the first embodiment, when a level of wind noise is less than the predetermined value (−10 dBV) and a speech of the user U is detected, the band-pass filter and volume adjustment unit 31 (an example of the signal processing unit) of the circuit board 20 allows a voice signal in a frequency band from 700 Hz to 4 kHz (an example of a third frequency band), which is higher than the frequency band of the wind noise, among voice signals based on the speech of the user U to pass through. In addition, the band-pass filter and volume adjustment unit 31 of the circuit board 20 increases a volume level of the voice signal based on the speech of the user U by +3 dB (an example of a third predetermined value). As a result, according to the headphone 1 or the earphone control method of the first embodiment, when the user U speaks through the headphone 1 in a state where the level of the wind noise is relatively low, it is possible to adaptively adjust characteristics of a user voice to be transmitted to the smartphone P2 (an example of the terminal) of the call partner and to reduce the wind noise included in the user voice.

According to the headphone 1 (an example of the earphone) of the first embodiment, when the level of the wind noise is less than the predetermined value (−10 dBV) and a speech of the user U is not detected, the band-pass filter and volume adjustment unit 31 (an example of the signal processing unit) of the circuit board 20 allows a voice signal in a frequency band from 1 kHz to 3 kHz (an example of a fourth frequency band), which is higher than the frequency band of the wind noise, among ambient sound signals to pass through. In addition, the band-pass filter and volume adjustment unit 31 of the circuit board 20 adds −3 dB to a volume level of the ambient sound signal (that is, decreases the volume level by 3 dB (an example of a fourth predetermined value)). As a result, according to the headphone 1 or the earphone control method of the first embodiment, when the user U does not speak through the headphone 1 in a state where the level of the wind noise is relatively low, it is possible to adaptively adjust characteristics of a user voice to be transmitted to the smartphone P2 (an example of the terminal) of the call partner and to reduce the wind noise included in the user voice.

Second Embodiment

A second embodiment according to the present disclosure will be described with reference to FIGS. 7 and 8. Since descriptions of parts that are the same as or equivalent to those of the first embodiment described above are redundant, these parts are denoted by the same reference numerals in the drawings and the descriptions thereof may be omitted or simplified.

Background of Second Embodiment

First, the background of the present embodiment will be described.

In the configuration disclosed in WO2018-163423A1, it is possible to reduce wind noise when wind noise is generated while listening to a played music sound. However, in the configuration disclosed in WO2018-163423A1, the wind noise is only uniformly reduced. For example, a state of wind around a user may vary as there are days with strong wind and days with weak wind, or the strength of the wind changes depending on the time of day. Therefore, there is room for improvement in reducing the wind noise generated around the user according to a user situation (for example, a situation in which a voice from a call partner is received or a situation in which the user is listening to music from his/her portable player).

In this regard, in the present embodiment, it is possible to adaptively reduce the wind noise included in a voice signal or a music signal according to a state of wind around the user and an operation mode specified by the user.

[Configuration of Circuit Board]

Next, a configuration of the circuit board 20 will be described with reference to FIG. 7. FIG. 7 is a hardware block diagram illustrating processing in the circuit board 20 according to the second embodiment.

In the present embodiment, a case where the headphone 1 is used for playing music rather than being used as a telephone will be described as an example, and in the main circuit 30, the band-pass filter and volume adjustment unit 31 does not operate. In the ANC circuit 40 as well, the second analog-to-digital conversion unit 42B, the side tone filter unit 43, the feedforward filter unit 45, and the second digital addition unit 46B do not operate. In the detection circuit 50 as well, the speech detection unit 51 and the beam form unit 53 do not operate. Therefore, in FIG. 7, blocks representing these units and signal lines related thereto are shown by dotted lines. However, even when the headphone 1 is used as a telephone, the disclosed content according to the present embodiment can be appropriately applied.

Figure 7:
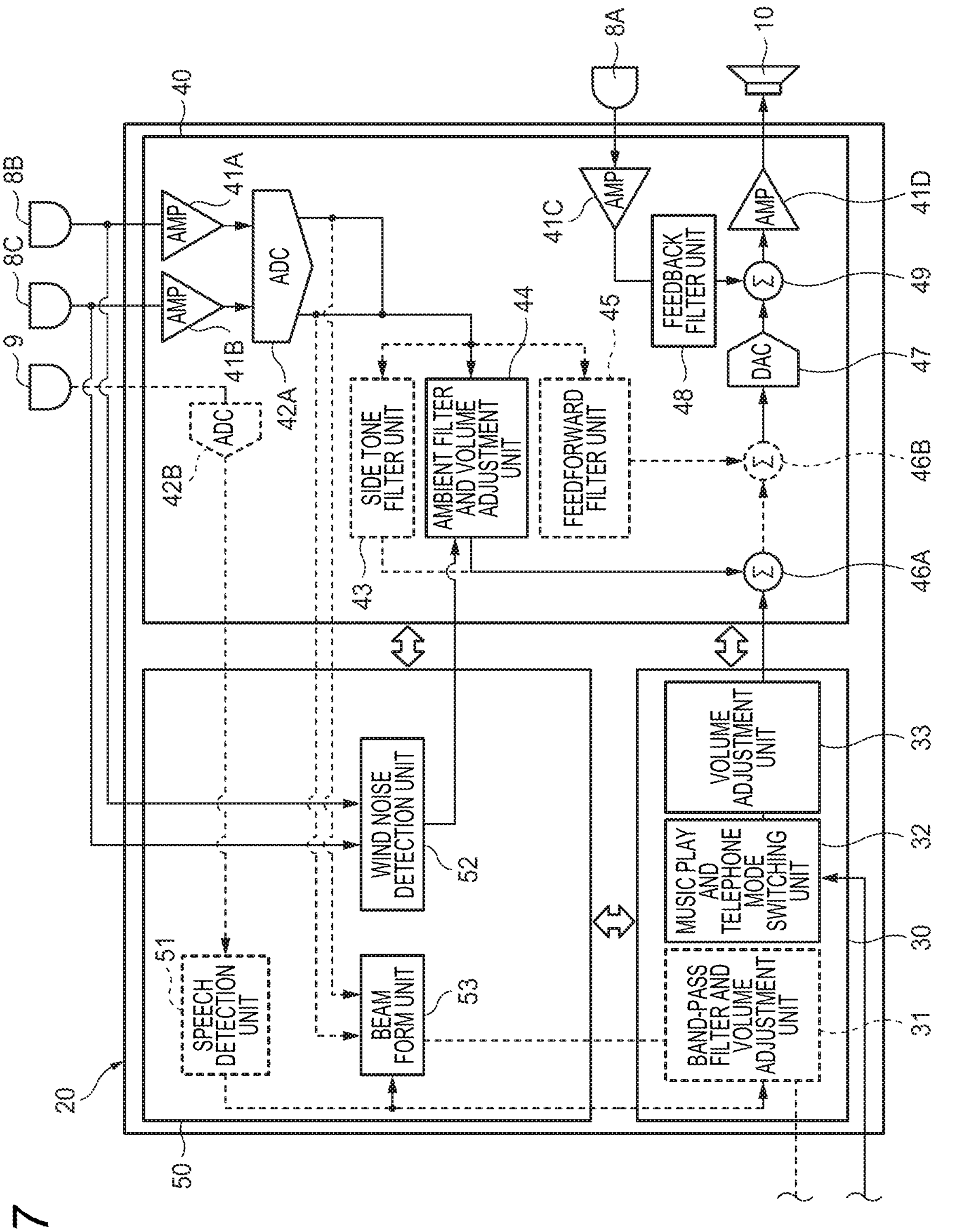
FIG. 7 is a hardware block diagram illustrating processing in a circuit board according to a second embodiment.

As shown in FIG. 7, in the present embodiment, the music play and telephone mode switching unit 32 receives a music signal to be played transmitted from the smartphone P1 of the user U, and determines that the music signal is for music play use based on a reception result. Then, the music play and telephone mode switching unit 32 switches the operation mode of the headphone 1 to the music play use, and transmits the received music signal to the volume adjustment unit 33. When the headphone 1 is used as a telephone, the music play and telephone mode switching unit 32 transmits a voice from the smartphone P2 of the call partner.

The wind noise detection unit 52 of the present embodiment detects wind noise generated around the user U according to analog signals of two channels output from the external microphone 8B and the speech microphone 8C, and determines (detects) whether wind noise is generated. Further, the wind noise detection unit 52 detects a level (intensity) of the wind noise. The wind noise detection unit 52 transmits these detection results to the ambient filter and volume adjustment unit 44 of the ANC circuit 40.

In the present embodiment, the ambient filter and volume adjustment unit 44 is set to ON by the user U, and receives voice digital signals of two channels output from the first analog-to-digital conversion unit 42A as ambient sound signals. The ambient filter and volume adjustment unit 44 also receives the detection result of the wind noise detection unit 52.

Then, the ambient filter and volume adjustment unit 44 adjusts characteristics (volume level) of the voice signals of two channels based on the intensity of the wind noise and the input of the voice signals. At this time, a setting value for defining the volume level of the ambient sound signal is set in advance in the ambient filter and volume adjustment unit 44, and the volume level is adjusted with the setting value as a reference. The user U can freely specify the setting value by an application or the like of the smartphone P1. By specifying the setting value, it is possible to define in advance at what volume level an ambient sound of the user U is to be output to the driver 10 in a normal state.

The ambient filter and volume adjustment unit 44 transmits the voice signals of two channels whose volume levels are adjusted to the first digital addition unit 46A. A music signal is transmitted from the main circuit 30 to the first digital addition unit 46A, and the first digital addition unit 46A adds the music signal and the voice signals.

In this manner, the volume level is adjusted based on the intensity of the wind noise and the input of the voice signals or the music signal by operations of the ambient filter and volume adjustment unit 44 and the first digital addition unit 46A. As a result, the driver 10 outputs the music signal to which the ambient sound signals whose volume levels are adjusted are added. Therefore, even when a state of wind around the user U changes such as an intensity change or a momentary change of the wind, it is possible to adaptively reduce wind noise included in the voice signal or the music signal according to the state of the wind around the user U and the operation mode specified by the user U.

At this time, the feedback filter unit 48 generates an inverted-phase signal of a sound signal, and outputs the inverted-phase signal to the analog addition unit 49. The analog addition unit 49 receives not only the inverted-phase signal but also the music signal to which the ambient sound signals whose volume levels are adjusted are added. That is, as a result, the driver 10 outputs a signal obtained by adding the music signal to which the ambient sound signals whose volume levels are adjusted are added and the inverted-phase signal of the sound signal.

[Processing Flow in Circuit Board]

Next, a processing flow in the circuit board 20 according to the present embodiment will be described with reference to FIG. 8. FIG. 8 is a flowchart illustrating the processing flow in the circuit board 20 shown in FIG. 7.

Figure 8:
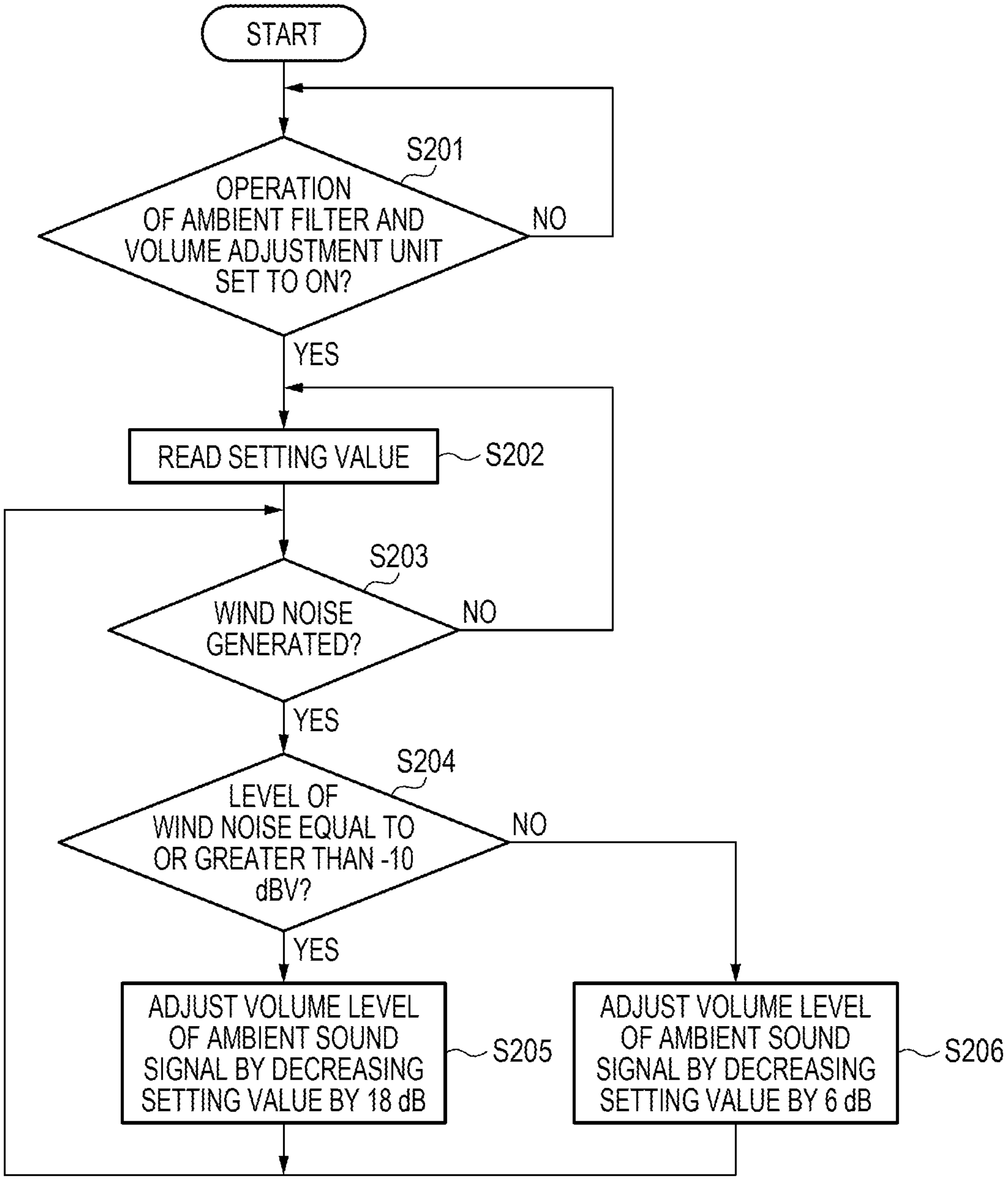
FIG. 8 is a flowchart illustrating a processing flow in the circuit board shown in FIG. 7.

As shown in FIG. 8, the circuit board 20 determines whether the operation of the ambient filter and volume adjustment unit 44 is set to ON by the user U (S201). When the circuit board 20 determines that the operation is not set to ON (NO in S201) as a determination result, the processing flow returns to step S201 again.

That is, as long as the operation of the ambient filter and volume adjustment unit 44 is not set to ON, the processing flow does not proceed to step S202 and the subsequent steps. That is, when the operation is set to OFF, it means that the user U inputs a specification that the ambient sound signal is not added to the voice signal or the music signal, and at this time, the circuit board 20 outputs the input voice signal or music signal from the driver 10 as it is.

On the other hand, when the circuit board 20 determines that the operation of the ambient filter and volume adjustment unit 44 is set to ON (YES in S201), the setting value freely selected by the user U is read and set in the ambient filter and volume adjustment unit 44 (S202).

Next, the wind noise detection unit 52 detects wind noise around the user U according to the digital signals of two channels based on the external microphone 8B and the speech microphone 8C to determine whether wind noise is generated (S203). When the wind noise detection unit 52 determines that no wind noise is generated as a determination result (NO in S203), the processing flow returns to step S202. That is, as long as no wind noise is detected, the processing flow does not proceed to step S204 and the subsequent steps.

When the wind noise detection unit 52 determines that wind noise is generated (YES in S203), the wind noise detection unit 52 detects a level of the wind noise by determining whether the digital signals of two channels are equal to or greater than a threshold read in advance (S204). In the present embodiment as well, the threshold is set to −10 dBV.

When the wind noise detection unit 52 determines that the level of the wind noise is equal to or greater than a predetermined value (−10 dBV) (YES in S204), the ambient filter and volume adjustment unit 44 adjusts the volume level of the ambient sound signal to be added to the input music signal by decreasing the setting value set in step S202 by 18 dB (an example of a first predetermined value) (S205), and returns to step S203. Therefore, in the present embodiment, when the ambient filter and volume adjustment unit 44 is set to ON in a state where the wind noise is relatively loud, as long as the wind noise is detected, it is possible to adaptively reduce the wind noise included in the voice signal or the music signal according to the state of the wind around the user U and the operation mode specified by the user U.

On the other hand, when the wind noise detection unit 52 determines that the level of the wind noise is less than the predetermined value (−10 dBV) (NO in S204), the ambient filter and volume adjustment unit 44 adjusts the volume level of the ambient sound signal to be added to the input music signal by decreasing the setting value set in step S202 by an even smaller value 6 dB (an example of a second predetermined value) (S206), and returns to step S203. Therefore, in the present embodiment, when the ambient filter and volume adjustment unit 44 is set to ON in a state where the wind noise is relatively small, as long as the wind noise is detected, it is possible to adaptively reduce the wind noise included in the voice signal or the music signal according to the state of the wind around the user U and the operation mode specified by the user U.

As described above, according to the headphone 1 (an example of an earphone) of the second embodiment, the headphone 1 worn by the user U includes: a plurality of microphones (an example of a sound pickup unit) that pick up ambient sounds of the user U; the music play and telephone mode switching unit 32 (an example of a receiving unit) capable of receiving a voice signal from the smartphone P2 (an example of a terminal) of a call partner of the user U or a music signal for playing music from the smartphone P1 (an example of a terminal) of the user U; the wind noise detection unit 52 that detects whether wind noise is generated around the user U based on the ambient sounds picked up by the plurality of microphones; the ambient filter and volume adjustment unit 44 (an example of a signal processing unit) of the circuit board 20 that adjusts, based on an intensity of the wind noise and the input of the voice signal or the music signal, characteristics of an ambient sound signal to be added to the voice signal or the music signal; and the driver 10 (an example of a sound output unit) that outputs the voice signal or the music signal to which the ambient sound signal whose characteristics are adjusted is added.

According to an earphone control method of the second embodiment, the earphone control method in the headphone 1 (an example of an earphone) worn by the user U includes: a step of picking up ambient sounds of the user U at a plurality of locations (sound pickup step); a step of receiving a voice signal from the smartphone P2 (an example of a terminal) of a call partner of the user U or a music signal for playing music from the smartphone P1 (an example of a terminal) of the user U (receiving step); a step of detecting whether wind noise is generated around the user U based on the ambient sounds picked up in the sound pickup step (wind noise detection step); a step of adjusting, based on an intensity of the wind noise and the input of the voice signal or the music signal, characteristics of an ambient sound signal to be added to the voice signal or the music signal (signal processing step); and a step of outputting the voice signal or the music signal to which the ambient sound signal whose characteristics are adjusted is added (sound output step).

As a result, according to the headphone 1 or the earphone control method of the second embodiment, even when a state of wind around the user U changes such as an intensity change or a momentary change of the wind, it is possible to adaptively reduce wind noise included in a voice signal or a music signal according to the state of the wind around the user U and an operation mode specified by the user U.

According to the headphone 1 (an example of the earphone) of the second embodiment, when a level of the wind noise is equal to or greater than a predetermined value (−10 dBV), the ambient filter and volume adjustment unit 44 (an example of the signal processing unit) of the circuit board 20 adjusts a volume level of an ambient sound signal to be added to the input voice signal or the music signal by decreasing a setting value by 18 dB (an example of a first predetermined value). As a result, according to the headphone 1 or the earphone control method of the second embodiment, when the ambient filter and volume adjustment unit 44 is set to ON in a state where the wind noise is relatively loud, it is possible to adaptively reduce the wind noise included in the voice signal or the music signal according to the state of the wind around the user U and the operation mode specified by the user U.

According to the headphone 1 (an example of the earphone) of the second embodiment, when the level of the wind noise is less than the predetermined value (−10 dBV), the ambient filter and volume adjustment unit 44 (an example of the signal processing unit) of the circuit board 20 adjusts the volume level of the ambient sound signal to be added to the input voice signal or the music signal by decreasing the setting value by an even smaller value 6 dB (an example of a second predetermined value). As a result, according to the headphone 1 or the earphone control method of the second embodiment, when the ambient filter and volume adjustment unit 44 is set to ON in a state where the wind noise is relatively small, it is possible to adaptively reduce the wind noise included in the voice signal or the music signal according to the state of the wind around the user U and the operation mode specified by the user U.

According to the headphone 1 (an example of the earphone) of the second embodiment, when receiving a designation not to add the ambient sound signal to the voice signal or the music signal, the ambient filter and volume adjustment unit 44 (an example of the signal processing unit) outputs the input voice signal or music signal from the driver 10 (an example of the sound output unit). As a result, according to the headphone 1 or the earphone control method of the second embodiment, the user U inputs a designation not to add the ambient sound signal to the voice signal or the music signal, and the operation of the ambient filter and volume adjustment unit 44 is set to OFF. Therefore, the input voice signal or music signal is output from the driver 10 as it is without being added with an ambient sound.

According to the headphone 1 (an example of the earphone) of the second embodiment, the headphone 1 further includes: the internal microphone 8A (an example of a sound pickup unit) that picks up a sound signal of the voice signal or music signal output from the driver 10 (an example of the sound output unit); and the feedback filter unit 48 (an example of a sound filter) that generates an inverted-phase signal of the sound signal. The driver 10 outputs a signal obtained by adding the voice signal or music signal to which the ambient sound signal whose characteristics are adjusted is added and the inverted-phase signal of the sound signal. As a result, according to the headphone 1 or the earphone control method of the second embodiment, it is possible to actively remove noise in the ambient sound of the user U that cannot be completely physically controlled by the ear pad 7 and passes through the ear pad 7 and enters the acoustic space 11 of the headphone 1. Therefore, the user U can hear a clearer voice signal or music signal.

Third Embodiment

A third embodiment according to the present disclosure will be described with reference to FIGS. 9 and 10. Since descriptions of parts that are the same as or equivalent to those of the first and second embodiments described above are redundant, these parts are denoted by the same reference numerals in the drawings and the descriptions thereof may be omitted or simplified.

Background of Third Embodiment

First, the background of the present embodiment will be described.

In the configuration disclosed in JP2015-219527A, since compensation using a signal including an acoustic noise component picked up by the internal microphone is performed when the user is walking, for example, it is possible to reduce the acoustic noise signal included in an audio signal. However, in the configuration disclosed in JP2015-219527A, a case where noise reduction by a body motion state of a user wearing the audio headset and addition of an ambient sound of the user are properly controlled is not assumed. Therefore, when the user wearing the audio headset is walking, or talking to a person face-to-face, there is room for improvement in the audio headset adaptively reducing, from the audio signal, not only the ambient sound but also noise signals such as breathing sound, user voice, and pulse sound from the user or capturing the ambient sound into the audio signal.

In this regard, in the present embodiment, according to the body motion state or a speech state of the user wearing the audio headset (in other words, the headphone 1 as an example of an earphone), the audio headset can adaptively reduce, from the audio signal, not only the ambient sound but also noise signals such as breathing sound, user voice, and pulse sound from the user, or can capture the ambient sound into the audio signal.

[Configuration of Circuit Board]

Next, a configuration of the circuit board 20 will be described with reference to FIG. 9. FIG. 9 is a hardware block diagram illustrating processing in the circuit board 20 according to the third embodiment.

In the present embodiment, a case where the headphone 1 is used for playing music rather than being used as a telephone will be described as an example, and as in the second embodiment, in the main circuit 30, the band-pass filter and volume adjustment unit 31 does not operate. In the ANC circuit 40 as well, the side tone filter unit 43, the feedforward filter unit 45, and the second digital addition unit 46B do not operate. In the detection circuit 50 as well, the speech detection unit 51, the beam form unit 53, and the wind noise detection unit 52 do not operate. Therefore, in FIG. 9, blocks representing these units and signal lines related thereto are shown by dotted lines. However, even when the headphone 1 is used as a telephone, the disclosed content according to the present embodiment can be appropriately applied.

Figure 9:
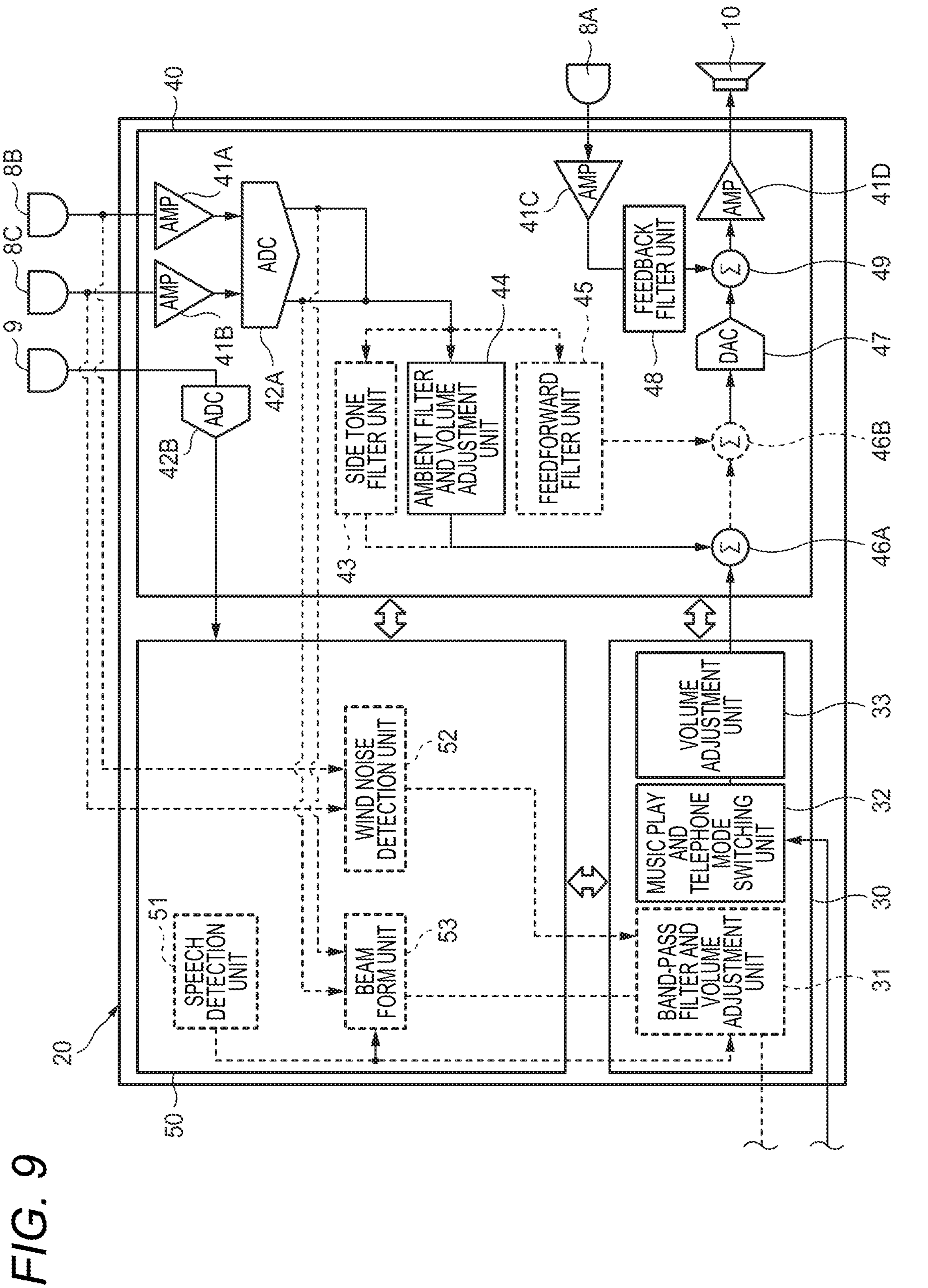
FIG. 9 is a hardware block diagram illustrating processing in a circuit board according to a third embodiment.

As shown in FIG. 9, in the present embodiment, the music play and telephone mode switching unit 32 (an example of a receiving unit) receives a music signal to be played transmitted from the smartphone P1 of the user U, and determines that the music signal is for music play use based on a reception result. Then, the music play and telephone mode switching unit 32 switches the operation mode of the headphone 1 to the music play use, and transmits the received music signal to the volume adjustment unit 33. When the headphone 1 is used as a telephone, the music play and telephone mode switching unit 32 transmits a voice from the smartphone P2 of the call partner.

The bone conduction sensor 9 (an example of a vibration detection unit, which is an example of a detection unit) of the present embodiment detects vibration based on a movement of the user U. That is, the bone conduction sensor 9 is attached to the earphone to be in contact with a face around an ear or a back surface of an auricle as described above, and detects the vibration of human bones. Therefore, the bone conduction sensor 9 can detect not only the vibration associated with a voice spoken by the user U but also the vibration caused by the body movement of the user U.

The bone conduction sensor 9 transmits a detection result to the detection circuit 50 (an example of a signal processing unit which is an example of a control unit, or an example of a periodic sound determination unit which is an example of the control unit) through the second analog-to-digital conversion unit 42B. In a case where a periodic sound is generated in the detection result of the bone conduction sensor 9, it can be inferred that the user U is exercising, such as walking or running a marathon. Therefore, the detection circuit 50 determines whether a periodic sound is generated based on the detection result of the vibration transmitted from the bone conduction sensor 9. At the same time, the detection circuit 50 also detects a vibration level. The detection circuit 50 transmits the determination result and the vibration level to the ANC circuit 40.

The ambient filter and volume adjustment unit 44 receives a digital signal based on a voice of the external microphone 8B output from the first analog-to-digital conversion unit 42A. The ambient filter and volume adjustment unit 44 performs predetermined voice processing on this voice signal, adjusts a volume level of the voice signal, and transmits the voice signal to the first digital addition unit 46A. The first digital addition unit adds the voice digital signal transmitted from the ambient filter and volume adjustment unit 44 and a voice digital signal transmitted from the volume adjustment unit 33 of the main circuit 30, and then transmits a result to the second digital addition unit 46B.

In this manner, an ambient sound picked up by the external microphone 8B is added to a voice signal from the smartphone P1. That is, in the present embodiment, the ambient filter and volume adjustment unit 44 and the first digital addition unit 46A constitute an ambient sound adding unit (an example of the control unit).

The feedback filter unit 48 converts an analog signal based on the internal microphone 8A into an inverted phase to generate an inverted-phase signal, and outputs the inverted-phase signal to the analog addition unit 49. The analog addition unit 49 adds the voice signal output from the digital-to-analog conversion unit 47 and the voice signal (inverted-phase signal) output from the feedback filter unit 48 as an analog signal and outputs the analog signal to the fourth amplifier unit 41D.

As described above, the feedback filter unit 48 and the analog addition unit 49 reduce, based on a signal in which a part of a voice signal output from the driver 10 enters around the internal microphone 8A and is picked up, noise included in the voice signal from the smartphone P1. That is, in the present embodiment, the feedback filter unit 48 and the analog addition unit 49 constitute a noise reduction unit (an example of the control unit).

Here, the ANC circuit 40 of the present embodiment varies, based on the determination result of the periodic sound, operation control by configurations of the ambient filter and volume adjustment unit 44 and the first digital addition unit 46A as the ambient sound adding units and operation control by configurations of the feedback filter unit 48 and the analog addition unit 49 as the noise reduction units.

[Processing Flow in Circuit Board]

Next, a processing flow in the circuit board 20 according to the present embodiment will be described with reference to FIG. 10. FIG. 10 is a flowchart illustrating the processing flow in the circuit board 20 shown in FIG. 9.

Figure 10:
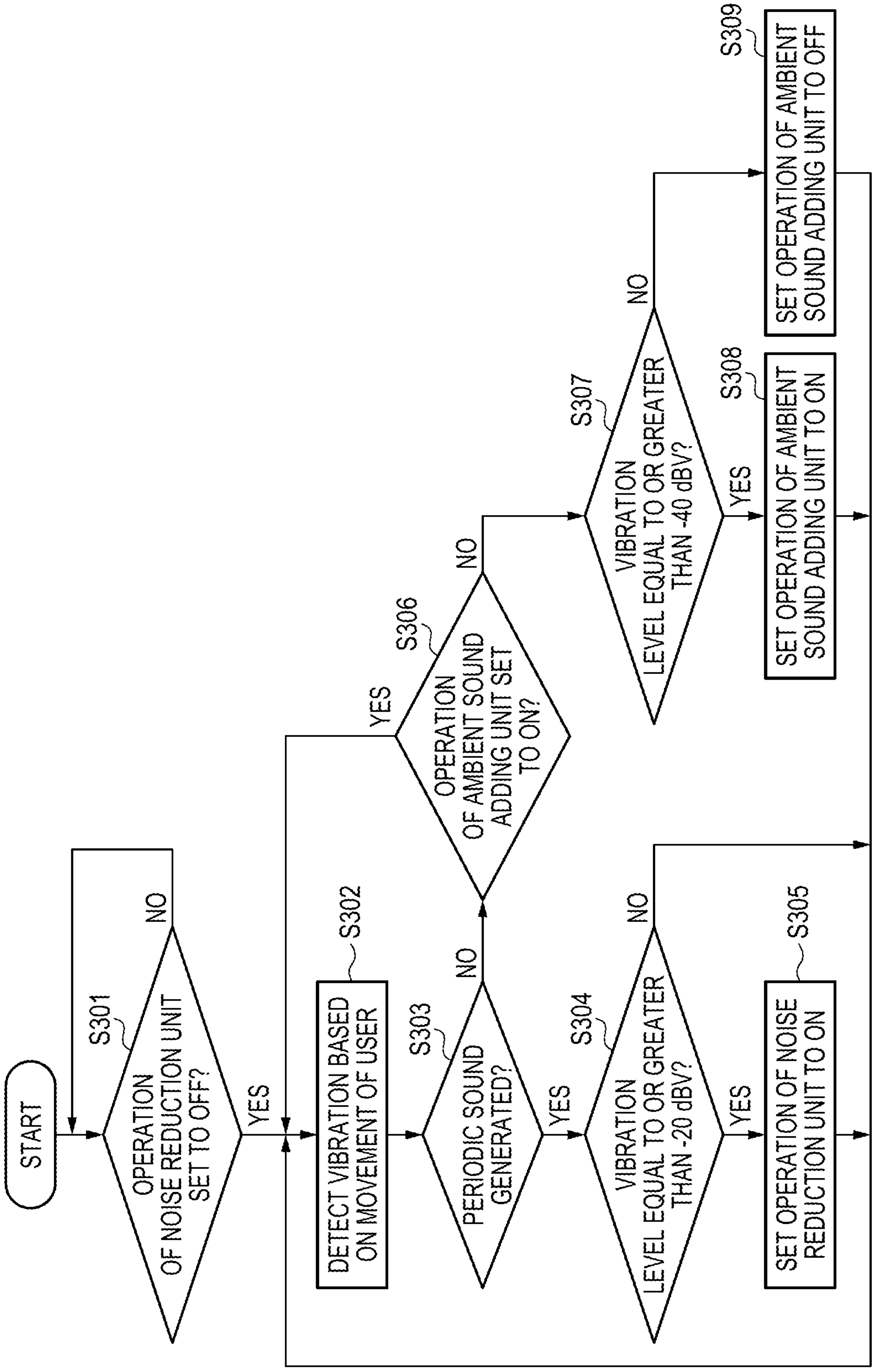
FIG. 10 is a flowchart illustrating a processing flow in the circuit board shown in FIG. 9.

As shown in FIG. 10, the circuit board 20 determines whether an operation of the feedback filter unit 48 and the analog addition unit 49 as the noise reduction units is set to OFF (S301). When the circuit board 20 determines that the operation is not set to OFF (NO in S301) as a determination result, the processing flow returns to step S301 again. That is, as long as the feedback filter unit 48 and the analog addition unit 49 as the noise reduction units are not set to OFF, the processing flow does not proceed to step S302 and the subsequent steps.

On the other hand, when the circuit board 20 determines that the feedback filter unit 48 and the analog addition unit 49 as the noise reduction units are set to OFF, the bone conduction sensor 9 detects vibration based on a movement of the user U, and the detection circuit 50 receives a result of the vibration (S302). Then, the detection circuit 50 determines whether a periodic sound is generated based on a detection result of the vibration transmitted from the bone conduction sensor 9 (S303).

When the detection circuit 50 determines that a periodic sound is generated as a determination result (YES in S303), the detection circuit 50 detects a vibration level thereof, and determines whether the vibration level is equal to or greater than a predetermined value (−20 dBV) (S304). When determining that the vibration level is equal to or greater than the predetermined value (−20 dBV) as a determination result (YES in S304), the detection circuit 50 transmits the determination result to the ANC circuit 40.

Here, in this case, it is presumed that the user U is exercising vigorously. Therefore, for the ANC circuit 40 to reduce noise in the acoustic space 11 associated with the vigorous exercise, the detection circuit 50 sets the operation of the feedback filter unit 48 and the analog addition unit 49 as the noise reduction units to ON (S305), and returns to step S302. On the other hand, when determining that the vibration level is less than the predetermined value (−20 dBV) as a determination result (NO in S304), the detection circuit 50 returns to step S302 without changing the operation setting of the feedback filter unit 48 and the analog addition unit 49 as the noise reduction units, that is, returns to step S302 without doing anything.

When the detection circuit 50 determines that no periodic sound is generated (NO in S303), the circuit board 20 determines whether an operation of the ambient filter and volume adjustment unit 44 and the first digital addition unit 46A as the ambient sound adding units is set to ON (S306). When the circuit board 20 determines that the operation is set to ON as a determination result (YES in S306), the processing flow returns to step S302 again. That is, unless the operation of the ambient filter and volume adjustment unit 44 and the first digital addition unit 46A as the ambient sound adding units is set to OFF, the processing flow does not proceed to step S307 and the subsequent steps.

On the other hand, when the circuit board 20 determines that the ambient filter and volume adjustment unit 44 and the first digital addition unit 46A as the ambient sound adding units are set to OFF, the detection circuit 50 detects a vibration level, and determines whether the vibration level is equal to or greater than a predetermined value (−40 dBV) (S307). When the detection circuit 50 determines that the vibration level is equal to or greater than the predetermined value (−40 dBV) as a determination result (YES in S307), it is presumed that the user U is speaking and talking with the surroundings. Therefore, the ANC circuit 40 sets the operation of the ambient filter and volume adjustment unit 44 and the first digital addition unit 46A as the ambient sound adding units to ON in order to correspond to the operation mode (S308), and returns to step S302. On the other hand, when the detection circuit 50 determines that the vibration level is less than the predetermined value (−40 dBV) (NO in S307), the ANC circuit 40 maintains the operation setting of the ambient filter and volume adjustment unit 44 and the first digital addition unit 46A as the ambient sound adding units to OFF (S309), and returns to step S302.

In this manner, the ANC circuit 40 varies, based on the determination result of the periodic sound, operation control by the ambient filter and volume adjustment unit 44 and the first digital addition unit 46A as the ambient sound adding units and operation control by the feedback filter unit 48 and the analog addition unit 49 as the noise reduction units. Therefore, it is possible to adaptively reduce a noise signal included in a music signal from the smartphone P1 of the user U and capture an ambient sound according to a body motion state or speech state of the user U.

As described above, according to the headphone 1 (an example of an earphone) of the third embodiment, the headphone 1 worn by the user U includes: the external microphone 8B (an example of a first sound pickup unit which is an example of a sound pickup unit) that picks up an ambient sound of the user U; a receiving unit (for example, the music play and telephone mode switching unit 32) that receives a music signal (audio signal, the same applies hereinafter) from a terminal (for example, the smartphone P1) of the user U; the bone conduction sensor 9 (an example of a vibration detection unit which is an example of a detection unit) that detects vibration based on a movement of the user U; the detection circuit 50 (an example of a periodic sound determination unit which is an example of a control unit) that determines whether a periodic sound is generated based on a detection result of the vibration; the ambient filter and volume adjustment unit 44 and the first digital addition unit 46A (an example of an ambient sound adding unit) that add the ambient sound picked up by the external microphone 8B to a music signal from the smartphone P1; and the ANC circuit 40 (an example of a signal processing unit which is an example of the control unit) of the circuit board 20 that varies, based on the determination result of the periodic sound, control by the ambient filter and volume adjustment unit 44 and the first digital addition unit 46A as ambient sound adding units.

Further, the headphone 1 (an example of the earphone) of the third embodiment further includes: the internal microphone 8A (an example of a second sound pickup unit which is an example of a sound pickup unit) disposed in the acoustic space 11 including an auricle of the user U; the driver 10 (an example of a sound output unit) that outputs a music signal from a terminal (for example, the smartphone P1) of the user U; and the feedback filter unit 48 and the analog addition unit 49 (an example of the noise reduction unit) that reduce, based on a signal in which a part of the music signal output from the driver 10 enters around the internal microphone 8A and is picked up, noise included in a music signal from the smartphone P1. The ANC circuit 40 of the circuit board 20 (an example of the signal processing unit which is an example of the control unit) varies, based on the determination result of the periodic sound, control by the feedback filter unit 48 and the analog addition unit 49 as the noise reduction units and control by the ambient filter and volume adjustment unit 44 and the first digital addition unit 46A as the ambient sound adding units.

According to an earphone control method of the third embodiment, the earphone control method in the headphone 1 (an example of an earphone) worn by the user U includes: a step (sound pickup step) of picking up an ambient sound of the user U; a step (receiving step) of receiving a music signal from a terminal (for example, the smartphone P1) of the user U; a step (vibration detection step) of detecting vibration based on a movement of the user U; a step (periodic sound determination step) of determining whether a periodic sound is generated based on a detection result of the vibration; a step (ambient sound adding step) of adding the ambient sound picked up in the sound pickup step to a music signal from the smartphone P1; and a step (signal processing step) of varying, based on the determination result of the periodic sound, control when the ambient sound is added.

Therefore, it is possible to adaptively reduce a noise signal included in a music signal from the smartphone P1 of the user U and capture an ambient sound according to a body motion state or speech state of the user U.

According to the headphone 1 (earphone) of the third embodiment, the headphone 1 worn by the user U includes: the internal microphone 8A (an example of the first sound pickup unit which is an example of the sound pickup unit) disposed in the acoustic space 11 including an auricle of the user U; the driver 10 (an example of the sound output unit) that outputs a music signal from a terminal (for example, the smartphone P1) of the user U; the bone conduction sensor 9 (an example of the vibration detection unit which is an example of the detection unit) that detects vibration based on a movement of the user U; the detection circuit 50 (an example of the periodic sound determination unit which is an example of the control unit) that determines whether a periodic sound is generated based on a detection result of the vibration; the feedback filter unit 48 and the analog addition unit 49 (an example of the noise reduction unit) that reduces, based on a signal in which a part of the music signal output from the driver 10 enters around the internal microphone 8A and is picked up, noise included in a music signal from the smartphone P1; and the ANC circuit 40 (an example of the signal processing unit which is an example of the control unit) of the circuit board 20 that varies, based on a determination result of the periodic sound, control by the feedback filter unit 48 and the analog addition unit 49 as the noise reduction units.

Further, the headphone 1 (earphone) of the third embodiment further includes: the external microphone 8B (an example of the second sound pickup unit which is an example of the sound pickup unit) that picks up an ambient sound of the user U, and the ambient filter and volume adjustment unit 44 and the first digital addition unit 46A (an example of the ambient sound adding unit) that add an ambient sound picked up by the external microphone 8B to a music signal from a terminal (for example, the smartphone P1). The ANC circuit 40 (an example of the signal processing unit which is an example of the control unit) of the circuit board 20 varies, based on the determination result of the periodic sound, control by the feedback filter unit 48 and the analog addition unit 49 as the noise reduction units and control by the ambient filter and volume adjustment unit 44 and the first digital addition unit 46A as the ambient sound adding units.

According to the earphone control method of the third embodiment, the earphone control method in the headphone 1 (an example of an earphone) worn by the user U includes: a step of picking up music in the acoustic space 11 by the internal microphone 8A (an example of a sound pickup unit) disposed in the acoustic space 11 including an auricle of the user U (sound pickup step); a step of outputting a music signal from the smartphone P1 (an example of a terminal) of the user U (sound output step); a step of detecting vibration based on a movement of the user U (vibration detection step); a step of determining whether a periodic sound is generated based on a detection result of the vibration (periodic sound determination step); a step of reducing, based on a signal in which a part of the music signal output in the sound output step enters around the internal microphone 8A and is picked up, noise included in the music signal from the smartphone P1 (noise reduction step); and a step of varying control when the noise is reduced based on the determination result of the periodic sound (signal processing step).

Therefore, it is possible to adaptively reduce a noise signal included in a music signal from the smartphone P1 of the user U and capture an ambient sound according to a body motion state or speech state of the user U.

Although various embodiments have been described above with reference to the drawings, the present disclosure is not limited to such examples. It is apparent to those skilled in the art that various changes, corrections, substitutions, additions, deletions, and equivalents can be conceived within the scope of the claims, and it should be understood that such changes, corrections, substitutions, additions, deletions, and equivalents also fall within the technical scope of the present disclosure. In addition, components in the embodiments described above may be combined freely in a range without deviating from the spirit of the invention.

The present application is based on Japanese patent applications (Japanese Patent Applications 2020-217010, 2020-217011, and 2020-217012) filed on Dec. 25, 2020, the contents of which are incorporated herein by reference.

INDUSTRIAL APPLICABILITY

The present disclosure is useful as an earphone and an earphone control method capable of adaptively reducing not only an ambient sound but also noise signals such as breathing sound, user voice, and pulse sound from a user wearing an audio headset or capturing an ambient sound into an audio signal according to a body motion state or speech state of the user.

In addition, the present disclosure is useful as an earphone and an earphone control method capable of adaptively reducing wind noise included in a voice signal or a music signal according to a state of wind around the user and an operation mode specified by the user.

Further, the present disclosure is useful as an earphone and an earphone control method capable of adaptively adjusting characteristics of a user voice to be transmitted to a terminal of a call partner according to a state of wind noise that may be generated during a call with the call partner and reducing the wind noise included in the user voice.

REFERENCE SIGNS LIST

1 headphone
2 headband
3 main body portion
4 housing
5 opening
6 partition plate
7 ear pad
8A internal microphone
8B external microphone
8C speech microphone
9 bone conduction sensor
10 driver
11 acoustic space
12 housing space
13 mobile phone network
20 circuit board
30 main circuit
31 band-pass filter and volume adjustment unit
32 music play and telephone mode switching unit
33 volume adjustment unit
40 ANC circuit
41A first amplifier unit
41B second amplifier unit
41C third amplifier unit
41D fourth amplifier unit
42A first analog-to-digital conversion unit
42B second analog-to-digital conversion unit
43 side tone filter unit
44 ambient filter and volume adjustment unit
45 feedforward filter unit
46A first digital addition unit
46B second digital addition unit
47 digital-to-analog conversion unit
48 feedback filter unit
49 analog addition unit
50 detection circuit
51 speech detection unit
52 wind noise detection unit
53 beam form unit

The invention claimed is:

1. An earphone configured to be worn by a user, the earphone comprising:

a first sound pickup unit configured to pick up an ambient sound of the user;

a receiving unit configured to receive a voice signal from a terminal of a call partner of the user or a music signal from a terminal of the user;

a detection unit configured to detect a periodic sound detected based on a movement of the user and wind noise generated around the user; and a control unit configured to process an output sound based on a picked-up sound signal picked up by the first sound pickup unit and a detection result by the detection unit, wherein the control unit includes a signal processing unit, in a case that the detection unit detects the periodic sound, the signal processing unit sets ON or OFF an operation for adding the ambient sound to the voice signal or the music signal in accordance with a level of vibration of the user, and sets OFF the operation for adding the ambient sound to the voice signal or the music signal in response to the level of vibration being less that a first threshold, and in a case that the detection unit detects the wind noise, the signal processing unit adjusts a volume level of the ambient sound to be added to the voice signal or the music signal.

2. The earphone according to claim 1, further comprising:

a sound output unit configured to output the music signal from the terminal of the user;

a noise reduction unit configured to reduce, based on a signal in which a part of the music signal output from the sound output unit enters around a second sound pickup unit and is picked up, noise included in the music signal from the terminal of the user, the second sound pickup unit being included in the first sound pickup unit and disposed in an acoustic space including an auricle of the user; and an ambient sound adding unit configured to add ambient sound picked up by the second sound pickup unit to the music signal from the terminal, wherein the signal processing unit varies control by the noise reduction unit and control by the ambient sound adding unit based on a detection result of the periodic sound.

3. The earphone according to claim 1, further comprising:

a sound output unit configured to output the music signal from the terminal of the user, wherein the first sound pickup unit includes a second sound pickup unit disposed in an acoustic space including an auricle of the user, the detection unit includes a vibration detection unit configured to detect the vibration based on the movement of the user, and the control unit further includes:

a periodic sound determination unit configured to determine whether the periodic sound is generated based on a detection result of the vibration, and a noise reduction unit configured to reduce, based on a signal in which a part of the music signal output from the sound output unit enters around the second sound pickup unit and is picked up, noise included in the music signal from the terminal of the user, wherein the signal processing unit varies control by the noise reduction unit based on a detection result of the periodic sound.

4. The earphone according to claim 2, further comprising:

an ambient sound adding unit configured to add ambient sound of the user picked up by the second sound pickup unit included in the first sound pickup unit to the music signal from the terminal of the user, wherein the signal processing unit varies control by the noise reduction unit and control by the ambient sound adding unit based on a detection result of the periodic sound.

5. The earphone according to claim 1, further comprising:

an inputting unit capable of inputting a voice signal from the terminal of the call partner of the user or a music signal from the terminal of the user; and a sound output unit, wherein the first sound pickup unit includes a plurality of sound pickup units configured to pick up ambient sounds of the user, the detection unit includes a wind noise detection unit configured to detect whether the wind noise generated around the user based on the ambient sounds picked up by the plurality of sound pickup units, and the sound output unit outputs the input voice signal or music signal to which the ambient sounds whose volume level is adjusted is added.

6. The earphone according to claim 5, wherein when a level of the wind noise is equal to or greater than a predetermined value, the signal processing unit adjusts the volume level of the ambient sounds to be added to the input voice signal or music signal by decreasing a first predetermined value from a setting value.

7. The earphone according to claim 6, wherein when the level of the wind noise is less than the predetermined value, the signal processing unit adjusts the volume level of the ambient sounds to be added to the input voice signal or music signal by decreasing the setting value by a second predetermined value smaller than the first predetermined value.

8. The earphone according to claim 5, wherein the signal processing unit outputs the input voice signal or music signal from the sound output unit when receiving a specification not to add the ambient sounds to the input voice signal or music signal.

9. The earphone according to claim 5, further comprising:

a second sound pickup unit configured to pick up a sound signal of a voice signal or a music signal output from the sound output unit; and a sound filter configured to generate an inverted-phase signal of the sound signal, wherein the sound output unit outputs a signal obtained by adding the voice signal or the music signal to which the ambient sounds whose characteristics are adjusted is added and the inverted-phase signal of the sound signal.

10. An earphone control method in an earphone configured to be worn by a user, the method comprising:

picking up an ambient sound of the user;

a receiving a voice signal from a terminal of a call partner of the user or a music signal from a terminal of the user;

detecting a periodic sound based on a movement of the user and wind noise generated around the user;

processing an output sound based on a picked-up sound signal in the picking up of the ambient sound of the user and a detection result in the detecting, wherein in case the periodic sound is detected, an operation for adding the ambient sound to the voice signal or the music signal is set ON or OFF in accordance with a level of vibration of the user, and the operation for adding the ambient sound to the voice signal or the music signal is set OFF in response to the level of vibration being less that a first threshold, and in case that the wind noise is detected, a volume level of the ambient sound to be added to the voice signal or the music signal is adjusted.

11. The earphone control method according to claim 10, further comprising:

outputting a music signal from a terminal of the user, wherein in the picking up of the ambient sound of the user, based on a signal in which a part of a music signal output from a sound output unit enters around a second sound pickup unit and is picked up, noise included in the music signal from the terminal of the user, the second sound pickup unit being included in a first sound pickup unit that picks up the ambient sound of the user and disposed in an acoustic space including an auricle of the user is reduced, and in the adjusting the volume level of the ambient sound, control by a noise reduction unit and control by an ambient sound adding unit is varied based on a detection result of the periodic sound.

12. The earphone control method according to claim 10, wherein in the picking up of the ambient sound of the user, ambient sounds are picked up at a plurality of locations, in the detecting, detecting whether wind noise is generated around the user based on the ambient sounds picked up at the plurality of locations, and in the processing the output sound, outputting the voice signal or the music signal to which the ambient sounds whose characteristics are adjusted is added.

13. An earphone configured to be worn by a user, the earphone comprising:

a plurality of sound pickup units configured to pick up ambient sound of the user;

a speech detection unit configured to detect a presence or an absence of a speech of the user;

a wind noise detection unit configured to detect whether wind noise is generated around the user based on the ambient sounds picked up by the plurality of sound pickup units; and a signal processing unit configured to, in case the wind noise is detected, a level of the wind noise is equal to or greater than a predetermined value, and the speech of the user is detected, allow a voice signal in a first frequency band, which is higher than a frequency band of the wind noise, among voice signals based on the speech of the user to pass through a band-pass filter, and increase a volume level of the voice signals based on the speech of the user by a first predetermined value.

14. The earphone according to claim 13, wherein in case the wind noise is detected, the level of the wind noise is equal to or greater than the predetermined value, and the speech of the user is not detected, the signal processing unit allows a voice signal in a second frequency band, which is higher than a frequency band of the wind noise, among signals of the ambient sounds to pass through the band-pass filter, and decreases a volume level of the signals of the ambient sounds by a second predetermined value.

15. The earphone according to claim 13, wherein in case the wind noise is detected, the level of the wind noise is less than the predetermined value, and the speech of the user is detected, the signal processing unit allows a voice signal in a second frequency band, which is higher than a frequency band of the wind noise, among the voice signals based on the speech of the user to pass through the band-pass filter, and increases a volume level of the voice signals based on the speech of the user by a second predetermined value.

16. The earphone according to claim 13, wherein in case the wind noise is detected, the level of the wind noise is less than a predetermined value, and the speech of the user is not detected, the signal processing unit allows a voice signal in a second frequency band, which is higher than a frequency band of the wind noise, among signals of the ambient sounds to pass through the band-pass filter, and decreases a volume level of the signals of the ambient sounds by a second predetermined value.

* * * * *